US012258812B1

(12) United States Patent
Arab

(10) Patent No.: US 12,258,812 B1
(45) Date of Patent: Mar. 25, 2025

(54) HIGH SECURITY ANTI-CLIMBING PET AND CHILD CONFINEMENT GATE

(71) Applicant: Melissa Arab, Shelby Township, MI (US)

(72) Inventor: Melissa Arab, Shelby Township, MI (US)

( * ) Notice: Subject to any disclaimer, the term of this patent is extended or adjusted under 35 U.S.C. 154(b) by 0 days.

(21) Appl. No.: 18/778,887

(22) Filed: Jul. 19, 2024

(51) Int. Cl.
*E06B 9/04* (2006.01)
*E04H 17/00* (2006.01)
*E05C 1/06* (2006.01)
*E06B 9/00* (2006.01)

(52) U.S. Cl.
CPC ............. *E06B 9/04* (2013.01); *E04H 17/004* (2021.01); *E05C 1/06* (2013.01); *E06B 2009/002* (2013.01)

(58) Field of Classification Search
CPC ........ E06B 9/04; E06B 9/02; E06B 2009/002; E04H 17/004; E05C 1/004; E05C 1/06; E05C 7/04
See application file for complete search history.

(56) References Cited

U.S. PATENT DOCUMENTS 321,171 A * 6/1885 Archibald ............ E04H 17/004 256/12
435,708 A * 9/1890 Poole .................... E04H 17/004 256/12
504,936 A * 9/1893 Niles ..................... E04H 17/004 256/12
5,293,721 A * 3/1994 Richard ............ A01K 39/0113 114/221 R
6,112,461 A * 9/2000 Cheng ....................... E06B 9/04 49/55
6,375,165 B1 * 4/2002 Sherratt .................... E06B 9/08 256/1
6,425,609 B2 * 7/2002 Cheng ................ E05B 65/0014 292/64
6,585,233 B1 * 7/2003 Sorben .................... E04H 17/00 256/1
6,681,523 B1 * 1/2004 Stener ....................... E06B 9/00 49/55
7,065,922 B1 * 6/2006 De Kruijf ................. E06B 9/04 49/463
9,382,750 B1 * 7/2016 Flannery ................. E05D 15/54
9,464,467 B1 * 10/2016 Flannery ............ E05B 65/0007

(Continued)

*Primary Examiner* — Justin B Rephann
(74) *Attorney, Agent, or Firm* — Joseph P. Kincart; Tracnik Law PLLC

(57) ABSTRACT

An improved system, apparatus, and methods for a pet and child confinement gate providing enhanced safety and deterrence of climbing attempts. The confinement gate includes first and second brace portions with an innovative locking system. A drop-in catch engages with a metal sheath by lifting and lowering the gate, providing a primary locking feature. A rotatable knob, when turned, extends a sliding bolt into a receiver hole on the opposite brace, securing the gate against all directions of movement. The top of the gate features a free-spinning mechanism, which may include cylindrical rollers or ball-bearings, equipped with noise-making loose objects and sensors to deter and detect climbing attempts. The free-spinning mechanism can also trigger auditory deterrents via an audio device and send alerts through communication circuitry to a caretaker's device, further enhancing security measures.

20 Claims, 19 Drawing Sheets

(56) References Cited

U.S. PATENT DOCUMENTS

| | | | | |
|---|---|---|---|---|
| 10,472,884 | B2 * | 11/2019 | Maytorena | E04H 17/004 |
| 11,739,589 | B1 * | 8/2023 | Kaiser | E06B 9/04<br>49/394 |
| 2001/0017471 | A1 * | 8/2001 | Cheng | E05B 65/0007<br>292/165 |
| 2003/0197164 | A1 * | 10/2003 | Monahan | E06B 9/08<br>256/24 |
| 2006/0055182 | A1 * | 3/2006 | Jefferys | E05F 1/066<br>292/251.5 |
| 2006/0207180 | A1 * | 9/2006 | Cheng | E05B 65/0014<br>49/57 |
| 2010/0229802 | A1 * | 9/2010 | Bok | E04H 17/004<br>119/416 |
| 2013/0227888 | A1 * | 9/2013 | Nur-tegin | E05D 15/02<br>49/226 |
| 2017/0350165 | A1 * | 12/2017 | Schort | E05B 65/0007 |
| 2019/0024447 | A1 * | 1/2019 | Maytorena | E04H 17/004 |
| 2020/0232273 | A1 * | 7/2020 | Kaiser | E06B 9/52 |
| 2021/0172222 | A1 * | 6/2021 | Wang | E05C 9/02 |
| 2024/0254832 | A1 * | 8/2024 | Abi Jomaa | H05B 47/105 |

* cited by examiner

HIGH SECURITY ANTI-CLIMBING PET AND CHILD CONFINEMENT GATE

FIELD OF THE DISCLOSURE

The present disclosure relates to a system, apparatus, and methods that provide safe confinement of pets or children and prevent agile and determined pets or children from climbing over the gate to escape confinement or from operating the gate to free themselves while providing simple one-handed operation and use for the user. The disclosure particularly addresses the need for enhanced security in pet and child confinement gates by incorporating a combination of mechanical and sensory deterrents to prevent climbing and tampering.

BACKGROUND OF THE DISCLOSURE

An estimated 65 million households in the United States own at least one dog. Nearly all of those households must utilize some form of safe confinement for their dog at some point in its life, with some owners using a form of safe confinement throughout the entire lifetime of the dog. Confinement may be necessary during the destructive puppy phase to prevent accidents or damage, to isolate dogs into one room or area while the owners are away from the house, to keep a dog away from unsafe environments, such as stairs or fireplaces, to separate pets into different areas because they don't get along, to separate pets from children or guests, to separate ill or injured pets that need solitude for recovery, to prevent dogs from accessing areas with carpeting or expensive furniture, etc.

One useful form of confinement is a pet/child gate, installed in a doorway to confine a dog or child to one room or area of the home while preventing the dog or child from entering or accessing other areas beyond the gate. While standard pet/child gates are useful and satisfactory to safely confine many family dogs and children, certain athletic, stubborn, or highly intelligent individuals can be difficult to confine using the standard pet/child gates currently available. Intelligent, independent, or curious breeds may immediately learn the method to open a gate to release themselves, may batter or chew their way through a gate, and/or may simply leap over a low gate, or climb over a taller gate. Some bright or determined children may be equally quick to get past a gate.

Existing gates on the market primarily focus on either height or sturdiness to prevent pets and children from escaping confinement; however, highly determined animals and children have been known to find ways to circumvent these barriers. Tall gates, while effective in some cases, can still be overcome by climbing, especially if the top of the gate provides a grip for the child or pet. Additionally, these taller gates can be cumbersome and difficult for adults to navigate, particularly when carrying objects or tending to other children or pets.

Additionally, for a standard interior door frame of 30 inches, common pet gates on the market have a gate opening width of just 18-20 inches which can be difficult for users to navigate or pass through when carrying bulky or wide objects, such as full laundry baskets. Such items have to be lifted over the top of the gate to pass through, which can be difficult for some users.

Another common issue with current pet/child gates is the complexity of their locking mechanisms. For example, the operation of many interior gates requires two hands or one hand and a foot, which can be precarious when the user is trying to pass through the gate while carrying heavy or bulky objects, squirming children or pets. This design flaw can lead to users leaving the gate open unintentionally, thereby defeating its purpose. Moreover, some gates with simpler locking mechanisms are easily manipulated by intelligent pets or children, rendering them ineffective.

Accordingly, there is a need for a high-security pet/child gate that addresses these limitations by preventing agile and determined pets or children from climbing over or operating the gate to free themselves, while also providing ease of use for caregivers.

SUMMARY OF THE DISCLOSURE

The present disclosure aims to fill this gap in the market by offering a gate that combines increased height, innovative locking mechanisms, innovative sensory deterrents, and a user-friendly design to enhance safety and convenience. The present disclosure provides advancements in technology yet to be fully integrated into pet/child gate designs. The present disclosure includes a multi-part latching mechanism that can be operated in steps, easily, with a single hand, making it convenient for users carrying bulky or wide objects.

The first or primary part of the latching mechanism includes a drop-in catch and metal sheath that secures the gate in a closed position. The second part includes a sliding bolt that locks into a receiving hole in an opposite frame, preventing the gate from being lifted, unseated, and swung open.

A third (and optional) part includes an opening at a far end of the sliding bolt for adding a securing mechanism, such as, for example, a carabiner clip, pin, or lock, to secure the sliding bolt and prevent the sliding bolt from being withdrawn or disengaged while the clip or lock is in place.

In some embodiments, a sliding bolt may be hinged at a far end of the sliding bolt such that the far end of the slide in bolt may be dropped down into a latching mechanism, such as, for example, an L shape of the primary latching mechanism, once engaged, preventing retraction until it is straightened by an adult user.

The present disclosure also includes innovative sensory deterrents that feature a smooth, cylindrical, free-spinning roller held in place along the top of the gate and/or frame. When pressure is applied by a pet or child attempting to climb, the roller spins, preventing them from gaining a foothold. Additionally, a sensor beneath the roller detects touch and pressure, triggering a strong but harmless vibration that deters further attempts to climb over the gate. This combination of mechanical and sensory deterrents significantly enhances the effectiveness of the gate in preventing escapes.

Use of sensory feedback, such as vibrations or noise, to deter climbing or tampering is an underexplored area that has the potential to significantly improve the efficacy of these gates. By incorporating such features, gates can offer a more proactive deterrent to climbing and undesired opening.

Accordingly, the present disclosure provides confinement apparatus and a method to prevent agile, determined, or destructive dogs and children from climbing over a gate and from opening the gate to release themselves from confinement, while providing easier operation and use for the user. The confinement apparatus includes increased gate height to a minimum of 45" height, a smooth, cylindrical, free-spinning roller held in place by a brace along the top of the gate and frame. The brace holding the free-spinning roller in place may include a sensor below the roller, which comes in contact with the metal of the roller when the dog's paws depress the roller, causing an unpleasant vibration throughout the free-spinning roller. While harmless, the sensation of the vibration on the dog's paw pads will be uncomfortable or frightening and will discourage the dog from placing their feet on top of the free-spinning roller.

In some embodiments, a confinement apparatus, according to the present disclosure, also includes a multipart latching mechanism, which can be operated easily, in steps, by the user with a single hand, but which cannot be easily opened by a dog or child. The first part of the latching mechanism is a drop-in catch and receiving sheath that seats the gate in a closed position. The second part is a sliding bolt that slides into the frame, to prevent the gate from being lifted, unseated, and swung open. The apparatus may include an additional third part of the latching mechanism with an opening at the end of the bolt to optionally add a carabiner clip or lock to the end of the sliding bolt of the latching mechanism, so it cannot be withdrawn or disengaged while the clip/lock is in place.

Alternatively, the sliding bolt may include a hinged far end or distal portion which drops down at the hinged point in an L shape of the primary latching mechanism, once engaged, preventing retraction of the sliding bolt until it is straightened by an adult user.

In a standard doorway of 30", the frame of the confinement apparatus in the present disclosure will make up 2" on either side of the gate, with the gate opening being 25" wide instead of the standard 18"-20". This increased width of the gate opening is designed to provide easier passage for users, particularly when carrying bulky or wide objects such as laundry baskets, grocery bags, squirming children or pets, or other items that are difficult to maneuver through narrower openings. The 2" frame on each side ensures that the gate remains securely mounted within the doorway, providing stability and strength without compromising the width of the opening. Although, in some embodiments of the device, the frame size on each side of the gate can be more than 2" and can be expandable.

The 25" wide opening is particularly advantageous in household settings where frequent movement of large items is necessary. Traditional gates with narrower openings can pose a significant inconvenience, requiring users to lift items over the gate or maneuver awkwardly to pass through. This wider opening eliminates such difficulties, enhancing the overall usability of the gate.

In some embodiments of the present device, a first or primary locking mechanism of the pet and child confinement gate provides a primary layer of security through a simple yet effective design. This mechanism features an L-shaped or drop-in catch mounted on a left interior frame of the gate and an extended metal sheath with a hole or cavity on a right interior frame. To engage the first locking mechanism, the user slightly lifts the gate using the knob, positioning the drop-in catch over the hole in the extended metal sheath. The gate may then be gently lowered, allowing a portion of the drop-in catch to insert into the hole, latching the gate securely in place.

In some embodiments of the present device, a second locking mechanism of the pet and child confinement gate features a strong, durable, and user-friendly design. This mechanism comprises a rotatable knob mounted on both sides/faces of the interior frame of the gate at least 36" from the base. When the user turns the knob in one direction, it engages a sliding bolt that extends horizontally into a corresponding receiver hole located on the opposite frame. The sliding bolt is engineered for precision, ensuring a tight and secure fit within the receiver hole. This secondary locking mechanism provides an additional layer of security by preventing any inward, outward and upward movement of the gate. The gate cannot be lifted, and the catching mechanism cannot be unseated from the sheath while the sliding bolt is in place. Additionally, the knob is ergonomically designed for easy operation, allowing adults to lock and unlock the gate with a simple, one-handed motion, while remaining secure against manipulation by children or pets. The knob or handle also provides an easy grip for the user to lift the gate during operation.

In some embodiments of the present device, a high-security pet and child confinement gate is enhanced with an innovative locking and deterrent system. The gate includes a rotatable knob on a gate brace portion (swinging gate portion) that, when turned/rotated in one direction, extends a sliding bolt into a receiver hole on a second brace portion, effectively securing the gate against all potential movements. The sliding bolt may feature a through-hole, allowing for the insertion of a locking device such as a lock, carabiner pin, or cotter pin to prevent the bolt from retracting, thus enhancing security. Additionally, an L-shaped drop-in catch on the gate brace portion can be engaged by manually lifting the gate brace portion using the knob, aligning the catch over a corresponding hole in a metal sheath on the second brace, and then lowering it to lock into place, providing a comprehensive two-layer security feature.

In further embodiments, the gate's security features may be complemented by a free-spinning mechanism located at the top of either or both brace portions. This free-spinning mechanism can vary between a cylindrical roller or a ball-bearing system, each capable of incorporating loose objects inside which produce noise when rotated. This noise acts as an auditory deterrent when pets or children attempt to climb the gate. Additionally, sensors within the free-spinning mechanism detect climbing attempts and can trigger an audio device to emit various deterring sounds, including pre-recorded messages, scary noises, trainer voices, or ultrasonic sounds.

In some embodiments, the confinement gate may be equipped with electronic communication circuitry. The communication circuitry may be operative to connect to wireless communication devices, such as, for example, one or more of: a cellular network, a Wi-Fi network, a Bluetooth device, an ultrawideband device, or other apparatus or device capable of wireless transmitting and receiving. The communication circuitry may include, for example, one or more of a transceiver, a processor, and an antenna, and be operative to send alerts to a user device upon detection of a climbing attempt. A user device may include, for example, a smart device, such as a smart phone, a smart tablet, a smart watch, and a smart headset. In some embodiments, the communication circuitry may be capable of communicating with one or more devices to indicate a location or status of the confinement gate.

In some embodiments, the communication circuitry may receive commands from a user (such as, for example, a caretaker or an owner) to activate one or more devices secured to the confinement gate or placed in proximity to the confinement gate. In this case, proximity may be considered within a distance discernable to a pet or child touching the confinement gate. The one or more devices that maybe activated upon receipt of a user commend may include, by way of non-limiting example, one or more of: deterrent sounds, generated vibrations, or begin and/or increase a spinning speed of a mechanism on the confinement gate, or other desired audible and/or motion-based action.

Still further, some embodiments, may include activation of devices, which may be based upon receipt of a state of a condition of the confinement gate. For example, if a sensor on the gate senses downward pressure, a device on the gate may be activated as discussed above to generate an audible and/or motion-based response to the downward pressure. The combination of user-initiated commands and condition-based commands thereby provides a comprehensive and responsive security solution.

In some embodiments, a primary catching mechanism can be located on a bottom swinging corner of a confinement gate, and a sheath may be located in a base of a frame immediately below the gate. A catching mechanism may be operated by lifting up the gate, aligning the gate over the sheath and dropping the gate gently down to seat catches in the sheath underneath.

In some embodiments, the primary catching mechanism can include a toggle that snaps to the left or right to clear the sheath, before dropping into the sheath to latch, allowing the gate to latch securely, when it swings closed, without lifting the gate. In such embodiments, a shape of a drop-in catch can be tapered so that when it interacts with the extended metal sheath, the catch bounces up over the top surface of the extended metal sheath and snaps into the sheath cavity.

In some embodiments, a drop-in catch and the extended metal sheath may include modular components rather than fixed elements of the gate. A modular design allows confinement gate components to be attached to a gate at customized positions according to user preferences and specific security needs. A drop-in catch and associated extended metal sheath can be securely mounted using screws, nut-bolts, or similar fastening methods.

Some embodiments may include expansion pieces that can be used to securely widen the gate as necessary for non-standard wider doorways. These expansion pieces may be designed to be easily attachable and detachable, allowing the gate to adapt to various doorway widths without compromising its structural integrity. This flexibility ensures that the gate can be used in a variety of home layouts and configurations, providing a versatile solution for pet and child confinement.

In some embodiments, a confinement gate's height can be adjusted to accommodate different sizes of pets and children. This adjustable height feature ensures that the gate can be customized for various applications, such as confining small pets or preventing large dogs from jumping over the gate. The adjustable mechanism may include extendable sections of the vertical frames, secured with locking pins or screws, providing a flexible solution for different needs.

In some embodiments, the width of the pet and child confinement gate can be adjusted to accommodate various doorway sizes and configurations. This adjustability may be achieved through expandable top rails that can be extended or retracted as needed. The top rails may feature a telescoping mechanism, allowing them to slide smoothly to a desired width, or additional rails of varying width, that lock securely together. Once the top rails are adjusted, additional vertical frames can be added or removed in latching receiving holes and repositioned accordingly to ensure structural integrity and secure attachment.

Other embodiments may feature an automatic locking mechanism for enhanced security. In such a design, the second latching mechanism may automatically engage when the gate is closed, eliminating the need for manual rotation of the knob. This automatic locking mechanism may use spring-loaded bolts that extend into the receiver hole upon closing the gate, ensuring it is always securely locked. This feature is particularly useful in preventing accidental openings and providing peace of mind to caregivers. In some embodiments, the knob may be operated using a motor for manual or automated rotation.

DESCRIPTION OF THE DRAWINGS

The accompanying drawings, which are incorporated in and constitute a part of this specification, illustrate several embodiments of the disclosure and, together with the description, explain the principles of the disclosure.

DETAILED DESCRIPTION

Figure 1A:
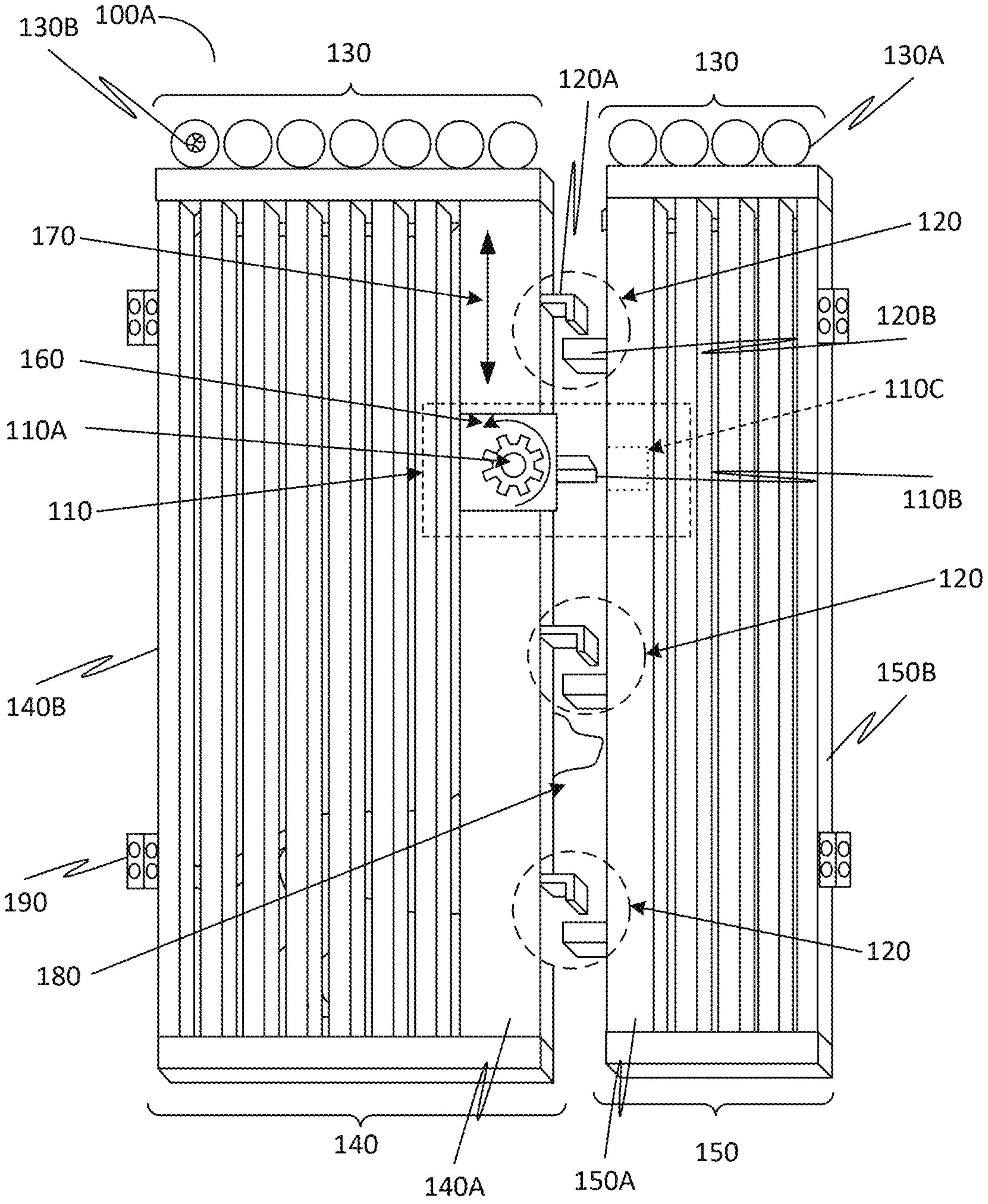
FIG. 1A illustrates an exemplary pet and child confinement gate according to some embodiments of the present device.

The present disclosure provides generally for systems, apparatus, and methods for safe and convenient confinement of agile and independent dogs and/or children, by installing free-spinning rollers of varying types along the top of the gate and frame, which prevent climbing, and a multi-part latching mechanism that can be easily operated in steps with one hand but cannot be released by the dog or child.

Additionally, the gate integrates advanced sensory and electronic components to enhance security further. These components may include pressure sensors, motion detectors, and communication modules that detect tampering or climbing attempts, triggering deterrent responses such as vibrations or audible alarms. The sensors can also send real-time alerts to a caregiver's mobile device, ensuring immediate awareness of any security breaches.

While the gate can be manufactured at any height that fits within a doorway to address the various sizes of dogs, in the preferred embodiment, the gate is a minimum of 45" tall to prevent more athletic medium to large breeds from easily jumping over the gate. Additionally, in some of the embodiments, a height of the gate can be customized with modular extensions, allowing it to be further increased or decreased if necessary. These extensions can be easily attached using secure fasteners, ensuring the gate remains sturdy and reliable even at greater heights. This adaptability makes the gate suitable for various environments, from standard household doorways to larger openings in homes or outdoor areas. The taller design, combined with free-spinning rollers and multipart latching mechanisms, provides comprehensive protection against climbing and jumping, effectively containing even the most determined pets and children.

While the gate can be made from wood, plastic, or metal, the preferred embodiment includes a lightweight but sturdy metal frame and metal hardware throughout for strength and ease of use. Additionally, the metal frame may be coated with a non-toxic, rust-resistant finish to enhance its longevity and maintain its appearance over time. The gate's design may also incorporate sleek, rounded edges and corners to prevent injury to pets and children. The metal hardware, including hinges, latches, and bolts, may be designed for smooth operation, allowing for easy one-handed use by adults while remaining secure against tampering by children and pets.

Preferred embodiments will include a free-spinning roller fastened to a top rail of the gate and frame. The roller may be, for example, a canister, cylinder, or pipe suspended over the top rail by a bracket, frame or cable in a way that allows it to spin freely in place when pressure is applied on the top or sides of the roller. Such a design may ensure that any climbing attempt by a pet or child will cause the roller to rotate, preventing them from gaining a stable grip and thereby deterring the attempt. Additionally, the roller may be constructed from durable materials such as metal or reinforced plastic to withstand constant use and environmental factors.

While the free-rolling spinner may be made of any material, the preferred embodiment is a metal spinner which has a built-in sensor to detect touch and pressure when the dog places its paws on the free-spinning roller at the top of the gate/frame, or a sensor in the frame that makes contact with the free-spinning roller when the dog presses down on the free-spinning roller in an attempt to climb the gate. The metal construction ensures durability and resistance to wear, while providing a deterrent against climbing. Upon detecting pressure, the sensor triggers a harmless but effective response, such as a vibration or a loud noise, to startle the pet and discourage further attempts.

If the spinner is made of plastic, wood, or another material, strips of metal sensors could be embedded in the spinners at intervals, for the width of the spinners. These embedded metal sensors ensure the spinners remain highly effective in detecting touch and pressure. Strategically placing these sensors at regular intervals across the spinners allows for comprehensive coverage, ensuring that any attempt to climb the gate is detected regardless of where the pressure is applied. When a pet or child presses against the spinner, these metal strips sense the touch and trigger deterrent responses such as vibrations or loud noises.

When the dog attempts to pull itself over the gate by placing its paws on the top of the free-spinning roller, the free-spinning roller spins toward the dog, dumping it back to the floor, and preventing the dog from using the top of the gate to pull itself up and over. The free-spinning roller's design ensures that any pressure applied to it results in immediate rotation, making it impossible for the dog to gain a stable foothold or leverage. This not only deters the initial climbing attempt but also discourages repeated attempts, as the dog learns that the roller provides no support for climbing. The roller's smooth and continuous movement is a key deterrent, enhancing the gate's overall effectiveness in keeping pets securely confined.

Further, when the free-spinning roller sensor detects physical contact or pressure from the dog's paws, it triggers a strong but harmless vibration in the spinner that the dog will find uncomfortable or frightening, further deterring the dog from additional attempts to climb over. This sensory feedback mechanism is designed to provide an immediate and noticeable response to climbing attempts, creating an unpleasant experience for the dog without causing any harm. The vibration disrupts the dog's efforts to gain a stable hold on the roller, reinforcing the ineffectiveness of attempting to climb over the gate.

Another embodiment of the spinner may include loose objects within the hollow free-spinning roller, such as metal bearings, gravel, or another material that rolls and collides noisily when the free-spinning rollers move. This design adds an additional layer of discouragement to the dog climbing by creating an unsettling and loud noise that startles the dog, making the climbing attempt less appealing. The noisy collisions serve a dual purpose: they not only deter the dog from trying to climb the gate but also alert the user to the dog's actions. The rattling sound produced by the loose objects inside the rollers acts as an immediate indicator that a climbing attempt is underway, allowing the caregiver to respond promptly.

In some embodiments of the present device, a comprehensive method for enhancing the security of a pet and child confinement gate and preventing unauthorized crossing attempts is disclosed. This method integrates multiple locking mechanisms and deterrent features to ensure security and ease of use. The method comprises attaching a left interior frame portion and a right interior frame portion of the gate to walls using industrial-strength hinges. These hinges may be specifically chosen to allow for both rotational movement and marginal lifting, facilitating the engagement and disengagement of the locking mechanisms. This dual functionality of the hinges facilitates proper operation of the gate, ensuring that it can be easily operated by adults while remaining secure against tampering by children or pets. Some embodiments may allow the gate to be temporarily mounted with secure tension mounts or permanently mounted with hardware such as screws, nut-bolt assemblies, or soldering.

The method for enhancing the security of a pet and child confinement gate may involve a multi-layered approach that combines mechanical deterrents, sensory deterrents, and advanced locking mechanisms. By integrating these elements, the gate becomes highly effective at preventing agile and determined pets or children from climbing over or operating the gate to free themselves.

In some embodiments of the present device, a key component of the gate security enhancement method may comprise incorporation of mechanical deterrents along the top of the gate. This may include the use of smooth, cylindrical, free-spinning rollers or ball-bearing mechanisms that are held in place by a brace on top of the gate. When pressure is applied by a pet or child attempting to climb, the rollers or balls spin freely, preventing them from gaining a foothold.

The ball-bearing mechanisms may comprise multiple metal balls, either hollow or solid, that are held securely within a ball-holding cup or within a linear rail, along the top of the gate. The hollow balls may accommodate loose objects inside, such as small metal pieces, compressible objects, or plastic bits. When the balls rotate due to climbing attempts, the loose objects create noise, serving as an additional auditory deterrent to scare and discourage pets or children from continuing their climbing efforts.

In some embodiments, the width of the free-spinning rollers or ball-bearing mechanisms can be designed to be greater than the width of the gate frames. This extended width ensures that the rollers or ball-bearing overhang the edges of the gate, providing a larger surface area that effectively prevents pets or children from gaining a stable grip anywhere along the top of the gate. The increased width amplifies the deterrent effect, making it even more challenging for climbing attempts to succeed.

In some embodiments of the present device, the gate security enhancement method may incorporate sensory deterrents to further deter climbing and tampering attempts. A pressure and/or motion sensor may be placed beneath the rollers or ball-bearing mechanisms. When the sensor detects touch and pressure, it may trigger a strong but harmless vibration that travels through the free-spinning rollers or ball-bearing mechanisms. This vibration, while not harmful, creates an unpleasant sensation on the pet's paw pads, discouraging them from placing their feet on top of the rollers or balls.

In some embodiments, the sensory deterrents may also include pressure sensors and audio devices integrated into the gate's design. These components may detect climbing attempts and emit loud noises, ultrasonic sounds, or vibrations to deter further attempts.

In some embodiments, the free-spinning rollers or ball-bearing mechanisms may be constructed from a material that can be slightly depressed when a pet or child attempts to climb the gate. Embedded sensors within these rollers or bearings detect this depression, triggering an immediate response. Upon sensing the pressure, the system activates a connected audio device to emit a deterrent sound or vibration, effectively startling the pet or child and discouraging further attempts to climb. Additionally, an alert is sent to the caregiver's mobile device, ensuring they are promptly informed of the gate-crossing attempt.

In one embodiment, a motor may be connected to the free-spinning rollers or ball-bearing mechanisms to enhance their deterrent effect. When a gate-crossing attempt is detected, the sensors trigger the motor to rapidly accelerate the rotation of the rollers or ball-bearings. This sudden increase in speed makes it even more challenging for the pet or child to maintain a grip, effectively deterring the attempt. The rapid spinning not only prevents a stable grip but also creates a dynamic and intimidating barrier, significantly enhancing the gate's security features. This motorized mechanism ensures that any climbing attempts are promptly and effectively discouraged, providing an additional layer of protection and training.

In some embodiments of the present device, the gate security enhancement method may also involve implementation of advanced locking mechanisms to prevent unauthorized access and gate opening. These mechanisms may include a multi-part latching system that can be easily operated in steps by a user with a single hand but is difficult for pets or children to open.

In some embodiments of the present device, a method for enhancing the security of a pet and child confinement gate may involve the use of a first locking mechanism complemented by a second locking mechanism. This dual-mechanism approach ensures robust security while maintaining ease of use, particularly beneficial in environments where agile and determined pets or children might attempt to bypass conventional safety barriers.

A first or primary locking mechanism, crucial to the gate's security, may feature a drop-in catch that fits into a corresponding metal sheath or barrel attached to the opposing gate frame. The drop-in catch is connected to the gate frame that holds the rotatable knob, and lifting the frame slightly enables the catch to align and drop into the sheath. Once engaged, this mechanism restricts both inward and outward movement of the gate, ensuring that the gate remains closed.

Complementing the first or primary locking mechanism, a second locking mechanism offers an additional layer of security. The second locking mechanism may comprise a sliding bolt system. This system may include a rotatable knob situated on the gate's interior frame. When rotated clockwise, the knob causes a sliding bolt to extend from the gate into a receiver hole located on the opposite frame, effectively locking the gate. This mechanism may be designed to be straightforward, allowing for quick and secure closure with a simple twist, which can be easily managed with one hand. The precise engineering of the bolt and receiver ensures a tight fit, minimizing any gaps that could be manipulated by pets or children to open the gate.

To disengage the first locking mechanism and open the gate, a user lifts the knob slightly, which raises the frame and the drop-in catch out of the metal sheath, freeing the gate for movement. This action can also be performed with one hand, making it particularly useful for adults who might be carrying items or managing children or pets simultaneously.

As used herein, an action performed with one hand signifies that a user may interact with a gate according to the present disclosure with only one hand contacting the gate at a given instance of time.

These embodiments leverage mechanical principles to create a fail-safe locking system that enhances the gate's security. The combination of a sliding bolt and a drop-in catch not only provides multiple points of security but also ensures that the gate can withstand attempts to open it, either by direct force or by manipulating the locking mechanisms.

In some embodiments of the present device, the security of a pet and child confinement gate may further be enhanced through the addition of a third locking mechanism and a fourth locking mechanism, each designed to provide an additional layer of security and redundancy.

The third locking mechanism may involve a safety feature that complements the second locking mechanism. This may be a locking pin or a carabiner clip that integrates with the second locking mechanism's sliding bolt at a far end. The bolt itself can be designed with a through-hole to accommodate this pin or clip. After engaging the second locking mechanism, the pin or clip is inserted through the bolt's far end through-hole, effectively securing the bolt in place and preventing it from being retracted. This feature may particularly be useful in scenarios where extra security is needed to prevent agile pets or intelligent children from figuring out how to unlock the gate. Alternatively, the sliding bolt may also be hinged at the far end of the sliding bolt to drop down the far end in an L shape once engaged, preventing retraction until the bolt end is returned to a straight position by an adult user. Magnets may be inset in sections of the end of the bolt to assist in maintaining the bolt in a straight or dropped position.

The fourth locking mechanism provides an upper-tier security measure and may consist of a rotational top bar or arc handle that may integrate a roller mechanism. This bar may be fixed across the top of the gate frame and may comprise a free-spinning roller designed to prevent over-the-top escapes by making it difficult for pets or children to gain a grip or leverage. When pressure is applied from above, the roller spins, destabilizing any grip and causing the climber to lose their balance. This roller may also incorporate sensory deterrents such as a vibration mechanism that activates upon touch, further discouraging climbing attempts.

To engage this fourth locking mechanism, the roller is held in place by a brace that locks into position once the gate is closed, securing the roller above the gate. Disengaging this mechanism would involve unlocking the brace, which can be integrated into the gate's overall locking strategy, requiring a deliberate and specific action accessible only to adults.

Together, the third and fourth locking mechanisms work in conjunction with the first and second locking mechanisms to ensure a comprehensive security system. This multi-layered approach not only deters and prevents physical manipulation of the gate but also addresses intelligent and persistent attempts to overcome the barrier, thereby maintaining a high level of confinement integrity.

In some embodiments of the present device, while the shapes, sizes, and designs of gates may vary to suit different architectural styles and functional requirements, the locking and latching mechanisms described can be universally integrated across all such variations. This adaptability ensures that regardless of the gate's aesthetic or structural design, whether it's a sleek, modern, minimalist gate or a more decorative, ornate, structure, the innovative locking mechanisms, as described in various embodiments of the present device, can be effectively employed. These mechanisms are designed to be modular and flexible, allowing them to be incorporated into any gate configuration to enhance security and usability Referring now to FIG. 1A, an exemplary child and pet confinement Gate 100A, as per the present disclosure, is illustrated. The Gate 100A comprises two main frame/brace portions: a Gate Frame Portion 140 and a First and Second Brace Portion 150. Each of these Gate Frame and Brace Portions (140 and 150) comprises multiple vertical frames. The Exterior Frames 140B and 150B can be connected to or fixed to walls where the Gate 100A is to be installed. These Exterior Frames 140B and 150B may be fixed to walls through Hinges 190, allowing the First and Second Brace Portions (140 and 150) of the Gate 100A to move freely inward and outward, providing flexible access and secure confinement when needed.

The Interior Frames 140A and 150A are equipped with the essential locking mechanisms for the Gate 100A. The Gate 100A may comprise multi-part latching/locking mechanisms to ensure secure confinement. A First or Primary Gate Latching/Locking Mechanism 120 comprises an L-Shaped Drop-In Catch 120A on a First Interior Frame 140A of a Gate Frame/Brace Portion 140 and a Metal Sheath 120B fixedly extended from a Second Interior Frame 150A of a Right Frame/Brace Portion 150 of the Gate 100A. The Metal Sheath 120B comprises a cavity (not shown) designed to accommodate a portion of the Drop-In Catch 120A into the cavity of the Metal Sheath 120B. This is achieved by lifting the Gate Frame Portion 140 of the Gate 100A by gripping the Knob 110A, lifting it up, aligning the Drop-In Catch 120A over the cavity in the Metal Sheath 120B, and then dropping a bent portion of the Drop-In Catch 120A into the cavity, thereby engaging the Primary Locking Mechanism 120 in a locked position. In some embodiments, the Gate 100A comprises a plurality of Primary Locking Mechanisms 120 (as shown in FIG. 1A).

In some embodiments, an additional left frame portion may be included to position the Gate Frame Portion 140 between the Left and the Right Frame Portion 150. Both the Left and Right Frame Portions 150 can be securely attached to doorway walls either permanently using screws or bolts, or temporarily with adjustable tension mounts or spring-loaded extenders. This allows for a versatile installation suitable for various structural requirements and preferences.

In addition to the First Locking Mechanism, the Gate 100A also features a Second Latching/Locking Mechanism 110 that comprises a rotatable Knob or Handle 110A located on the First Interior Frame 140A of the Gate Frame Brace Portion 140. The Knob 110A can be rotated clockwise and counterclockwise. A Sliding Bolt 110B is coupled to the Knob 110A. When rotated in a first direction, the Knob 110A extends the Sliding Bolt 110B into a Receiver Hole or Cavity 110C, formed in the Second Interior Frame 150A of the Right Frame Portion 150 of the Gate 100A, thereby engaging the Second Locking Mechanism 110 to a locked position. When the Second Locking Mechanism 110 is engaged, it effectively prevents the Gate 100A from swinging open (restricting both inward & outward movement), as well as restricting any vertical movement of the Gate Frame Brace 140. When the Knob 110A is rotated in a Second Direction (160), the Sliding Bolt 110B retracts from the Receiver Hole 110C, thereby disengaging the Second Locking Mechanism 110 to an unlocked position. When the Primary Locking Mechanism 120 is engaged in the locked position, it does not allow inward and outward movement of the Gate 100A, even if the Second Locking Mechanism 110 is in the disengaged position where the Sliding Bolt 110B is outside the Receiver Hole 110C.

To open the Gate 100A when the Primary Locking Mechanisms 120 are engaged (and the Second Locking Mechanism 110 is already disengaged), a user must first lift the Gate Frame Portion 140 of the Gate 100A by lifting the Knob 110A, thereby disengaging the Primary Locking Mechanism 120. The user then applies an inward or outward force depending on the desired direction to open the Gate 100A. The Knob 110A can be utilized to lift the Gate 100A and then gently lower it down as shown by Movement Direction 170. Multiple Primary Locking Mechanisms 120 may also be positioned along the height of the Gate 100A. For example, one Primary Locking Mechanism 120 may be above the Second Locking Mechanism 110, and two other locking mechanisms (e.g. a third and fourth locking mechanism) may be below the Second Locking Mechanism 110. The number of Primary Locking Mechanisms 120 can be adjusted or added based on the specific strength requirements of the Gate 100A. This redundancy ensures that even if one mechanism is tampered with, the other mechanisms maintain the integrity of the Gate 100A. This multi-layered security is particularly useful in preventing highly intelligent or agile pets and children from figuring out how to open the Gate 100A.

A Second Locking Mechanism 110 may be engaged, such as placed in a fastened position or locked position when the Knob 110A is rotated in a first direction, and the Sliding Bolt 110B is inserted into the Receiver Hole 110C.

The Primary Locking Mechanism 120 may be engaged or placed in a locked position when a portion of the Drop-In Catch 120A is in an engagement cavity formed in Metal Sheath 120B. In a fully locked position, when both the Primary and Second Locking Mechanisms 110 and 120 are engaged, a Dog 180 or a child cannot open the Gate 100A. To open the gate 100A, a user, such as, for example, a person that is a caretaker, needs to disengage the Second Locking Mechanism 110 by rotating the Knob 110A in a second direction to retract the Sliding Bolt 110B from the Receiver Hole 110C. Then, the user lifts the Gate Frame Portion 140 using the Knob 110A, thereby disengaging the Primary Locking Mechanism 120 (i.e., removing the portion of the Drop-In Catch 120A from the cavity formed in the Metal Sheath 120B). The person can then freely push or pull the Gate Frame Portion 140 of the Gate 100A to open it. This operation allows the Gate 100A to be opened and closed with a single hand, which is particularly useful when the user is carrying heavy items in the other hand.

Lifting the Gate Frame Portion 140 of the gate is difficult for a child or Dog 180, even if an agile and intelligent Dog 180 or child learns to rotate the Knob 110A to disengage the Sliding Bolt 110B. Furthermore, if a Pet 180 or a child attempt to climb over the Gate 100A, a Free-Spinning Mechanism 130 on the top rails of both the Gate Frame Portion 140 and the Right Frame Portion 150 prevents this. The Free-Spinning Mechanism 130 will spin inward, forcing the Pet 180 or child to stay inside by dropping the Pet 180 or child back to the floor and preventing them from crossing over the Gate 100A. The Free-Spinning Mechanism 130 may comprise metal Bearings such as 130A, Free-Spinning Rollers 131-133, or another object that can roll. In some embodiments of the present device, the Free-Spinning Mechanism 130 may be hollow inside and may contain several metal Balls 130B or any other Loose Objects 130B so that when the Free-Spinning Roller 130 rolls due to the force applied by a pet's paws or a child's hands, the metal Balls 130B inside rotate, colliding with the interior surface of the Free-Spinning Roller 130, thereby creating unexpected noise to startle the Pet 180 or child. Other objects may be put inside the Free-Spinning Roller 130 to create loud noise, startling and discouraging the Pet 180 or child from climbing over the Gate 100A. This additional feature adds further discouragement for Pets 180 or children attempting to climb the Gate 100A, as the noise created by the rolling objects inside the Free-Spinning Mechanism 130 will startle and deter them from continuing their efforts. The noisy rolling objects also alert the user to any tampering or climbing attempts on the Gate 100A.

In some embodiments, a motor may be connected to the Free-Spinning Roller 130 to enhance its deterrent effect. When a gate-crossing attempt is detected, the sensors trigger the motor to rapidly accelerate the rotation of the Free-Spinning Roller 130. This sudden increase in speed makes it even more challenging for the Pet 180 or child to maintain a grip, effectively deterring the attempt. The rapid spinning not only prevents a stable grip but also creates a dynamic and intimidating barrier, significantly enhancing the security of the Gate 100A. This motorized mechanism may ensure that any climbing attempts are promptly and effectively discouraged, providing an additional layer of protection.

In some embodiments of the present device, the Exterior Frames 140B and 150B may be fixed to walls through Hinges 190 and the Hinges 190 on one or both of the Exterior Frames 140B and 150B may be designed to allow for marginal lifting of the Frame Portions 140 and 150 of the Gate 100A. This lifting capability facilitates disengagement of the Primary Locking Mechanism 120. Specifically, when the Knob 110A is lifted, it causes the entire Gate Frame Portion 140 to rise slightly. This upward movement unseats the Drop-In Catch 120A from the hole or cavity formed in the Metal Sheath 120B, thereby disengaging the Primary Locking Mechanism 120. Once the Drop-In Catch 120A is unseated, the Gate 100A can swing open in either direction, providing flexible access.

The Hinges 190 may be engineered to support this vertical movement while maintaining the overall stability and security of the Gate 100A. They can be typically mounted in a way that allows for both the typical swinging motion of a gate and the necessary lifting motion to disengage the Primary Locking Mechanism 120. This dual functionality ensures that the Gate 100A remains securely closed when needed but can be easily opened with a simple lifting action. The design is particularly user-friendly, as it allows caregivers to operate the Gate 100A with one hand (e.g. contact or interact with the Gate with a single hand). One-handed interaction is useful for any user who requires the other hand to be used for a purpose other than interacting with the Gate 100A. Purposes other than interacting with the Gate 100A may include, by way of nonlimiting example, one or more of: supporting the user with a cane, crutch or walker; restraining a pet or child; operating a smart device; carrying objects not related to the operation of the Gate 100A; and pulling an item, such as luggage or grocery carrier through the gate. One-handed interaction is also useful for users who are physically impaired and only have physical use of a single hand and/or arm.

In some embodiments, the Hinges 190 used in the Exterior Frames 140B and 150B may include a variety of types to support the marginal lifting and facilitate operation of the Gate 100A. Examples may include but are not limited to lift-off hinges, which facilitate easy removal and reattachment; offset hinges, which provide additional clearance and flexibility; barrel hinges, known for their compact design and strength; and overlay hinges, which allow the Gate 100A to sit flush with the frame. Other suitable hinge types may include pivot hinges for smooth vertical movement, continuous (piano) hinges for even weight distribution, concealed hinges for a clean aesthetic, butt hinges for traditional applications, and strap hinges for added decorative appeal and strength. These various hinge options enable the Gate 100A to be customized for optimal functionality and design.

The marginal lifting feature also ensures that the Gate 100A remains difficult for Pets 180 and children to open. Even if a Pet 180 or child determines how to rotate the Knob 110A, the added requirement of lifting the Gate Frame Portion 140 to unseat the Drop-In Catch 120A adds another layer of complexity, making it less likely that they will be able to open the Gate 100A. The precise engineering of the Hinges 190 and the lifting mechanism ensures smooth operation and durability, even with repeated use. This thoughtful design enhances the overall functionality and reliability of the Gate 100A, providing peace of mind to caregivers knowing that the gate can effectively secure Pets 180 and children.

In some embodiments, the height of the Gate 100A may be adjusted to accommodate different sizes of Pets 180 and children. The adjustable height feature ensures that the Gate 100A can be customized for various applications, such as confining small Pets 180 or preventing large Dogs 180 from jumping over the Gate 100A. The adjustable mechanism may include extendable sections of the Vertical Interior Frames 140A and 150A, secured with locking pins or screws.

Figure 1B:
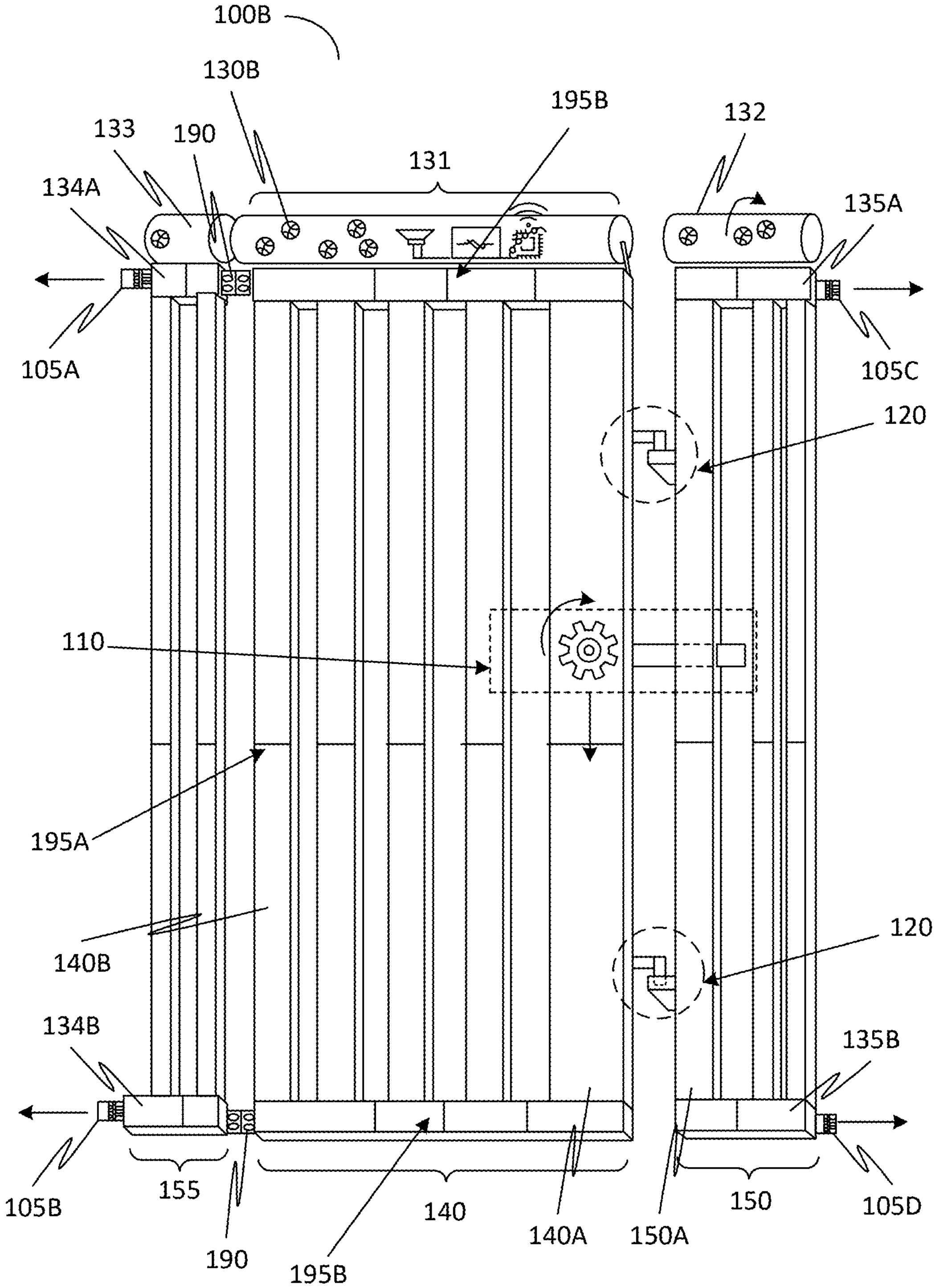
FIG. 1B illustrates an exemplary pet and child confinement gate comprising a wider gate frame portion between left and right frame portions in some embodiments of the present device.

Referring now to FIG. 1B, an exemplary view of a specialized pet and child confinement Gate 100B is illustrated. This exemplary Gate 100B provides a secure barrier within homes, ensuring that both pets and young children are safely contained within designated areas, while still allowing for easy passage by adults.

The structure of the Gate 100B consists of three main components: a Central Gate Frame Portion 140, a Left Frame Portion 155, and a Right Frame Portion 150. Each of these sections is made up of several vertical frames, enhancing the strength and durability of the Gate 100B. Notably, the Central Gate Frame Portion 140 is significantly wider than the Left and Right Frame Portions 155 and 150, with its width being 70-90% greater. This increased width not only makes the Gate 100B more resistant to attempts to push or pull it open but also provides a more spacious opening for adults to pass through easily.

The Gate 100B may utilize two main locking mechanisms namely the Primary Locking Mechanism 120 and the Second Locking Mechanism 110 as discussed in detail in FIG. 1A above. The Gate Frame Portion 140 is connected to the Left Frame Portion 155 through Hinges 190, which facilitate the opening and closing of the Gate 100B or Gate Frame Portion 140. These Hinges 190 allow the Gate Frame Portion 140 to swing freely both inward and outward when all gate locking mechanisms are disengaged. In some embodiments of the present device, the width of the Left Frame Portion 155 and the Right Frame Portion 150 is specifically designed to be relatively narrow, ranging from 2 to 5 inches.

In some embodiments, the Hinges 190 connecting the Gate Frame Portion 140 to the Left Frame Portion 155 of the pet and child confinement Gate 100B may be designed as self-closing hinges. Such self-closing hinges are engineered to automatically close the gate after it has been opened, enhancing safety and convenience by ensuring that the Gate 100B remains closed when not actively in use.

Self-Closing Hinges 190 operate by incorporating a spring mechanism within the Hinge 190 itself. When the Gate 100B is opened, the spring is tensioned, storing energy that is gradually released as the Gate 100B begins to close. This feature is particularly beneficial in environments where it is crucial to ensure that the Gate 100B closes immediately after passing through, such as in households with small children or pets that should not have access to certain areas.

The mechanics of Self-Closing Hinges 190 are straightforward yet highly effective. As the Gate 100B swings open, the spring inside the Self-Closing Hinge 190 compresses, building potential energy. Upon releasing the Gate 100B, this energy converts into kinetic energy, causing the Gate 100B to swing back toward the closed position. In some embodiments, the speed and force of the self-closing hinge-based gate closure can typically be adjusted according to the specific needs or safety requirements.

Additionally, these Self-Closing Hinges 190 may include damping features to prevent the Gate 100B from slamming shut, thereby reducing noise and increasing the lifespan of both the Gate 100B and the Self-Closing Hinge 190 by minimizing wear and tear. This controlled closing mechanism ensures that the Gate 100B closes securely and gently, providing an optimal balance between functionality and safety.

In some embodiments, the Self-Closing Hinges 190 may be particularly advantageous when used in conjunction with a Primary Locking Mechanism 120 that operates as a toggle-type drop-in catch. This toggle-type drop-in catch mechanism is designed to snap to the left or right to clear a sheath before dropping into a sheath hole to securely latch the Primary Locking Mechanism 120 as the Gate 100B swings. Such a design eliminates the need to manually lift the Gate 100B to engage the catch, facilitating a more user-friendly operation. When the Gate 100B is pushed or swings open, the toggle-type drop-in catch moves sideways due to its tapered design, temporarily clearing the top edge of the Extended Metal Sheath 120B. As the Self-Closing Hinges 190 initiate the closure of the Gate 100B, the tapered drop-in catch, influenced by its own weight and the motion of the Gate 100B, aligns with the sheath hole. The tapered shape of the drop-in catch allows the catch to glide up and over the sheath edge, using the built-up kinetic energy to bounce upward slightly and then snap down securely into the cavity/hole of the sheath. This action ensures a reliable and secure latching without additional effort from the user, making it especially useful where the gate is frequently opened and closed. The Self-Closing Hinge 190 mechanism combined with the toggle catch ensures that the gate seamlessly and securely closes every time, enhancing both convenience and safety.

For flexibility in installation, the Gate 100B features Flex Tension Mechanisms 105A-105B within the Top and Bottom Horizontal Frames or Rails 134A-134B of the Left Frame Portion 155 and Flex Tension Mechanisms 105C-105D within the Top and Bottom Horizontal Frames or Rails 135A-135B of the Right Frame Portion 150. These mechanisms allow the Gate 100B to be securely fitted within various doorway widths without permanent modifications to the walls. The Flex Tension Mechanisms 105A-105D can be adjusted using bolts or utilize spring-loaded elements that automatically exert the necessary pressure outward (as shown through arrows) to hold the Gate 100B firmly in place.

Moreover, the Gate 100B may also incorporate advanced Free-Spinning Mechanisms (Rollers 131, 132, 133) on the top frames of each of the Left Frame Portion 155, the Gate Frame Portion 140 and the Right Frame Portion 150. These Rollers 131-133 are designed to rotate upon contact, which prevents children and pets from gaining a stable grip to climb over the Gate 100B. This feature is based on the innovative designs found in the initial description of the device, which may include the use of sensory deterrents like vibrations to further discourage climbing efforts. In alternative embodiments, the Gate 100B may include ball bearings instead of Rollers 131-133 or a combination of both, depending on specific needs and the desired level of security and durability. This customization capability allows the Gate 100B to be tailored to meet varying household requirements effectively.

The vertical frames within each of the Left Frame Portion 155, the Gate Frame Portion 140, and the Right Frame Portion 150 feature Expandable Sections at designated points, labeled as 195A, to accommodate variations in height requirements for the Gate 100B. This adjustability is achieved through a specialized microscopic design integrated within the frames, which allows for precise, controlled expansion or contraction. The mechanism involves interlocking metal segments that can slide or telescope within one another, similar to the sections of a precision-engineered microscope's extendable arm. Each segment locks securely into place once the desired height is reached, ensuring stability and maintaining the structural integrity of the Gate 100B.

Similarly, the width of the Gate 100B can be adjusted by expanding or contracting at designated points, labeled as 195B, located within the top and bottom rails or frames. This feature is facilitated by a telescoping mechanism that allows the horizontal components of the gate to slide in and out with precision. Each segment within the rails can be securely locked into position once the desired width is achieved, ensuring the gate remains stable and securely fastened within the doorway or opening.

In some embodiments, the Left Frame Portion 155 and the Right Frame Portion 150 of the pet and child confinement Gate 100B may be fixed to a wall in a doorway using screws or nut-bolts. This permanent installation method provides enhanced stability and security, ensuring that the Gate 100B remains firmly anchored where extra durability is required. By utilizing screws or nut-bolts, the Gate 100B can be securely attached to the doorway's structural elements, offering a sturdy barrier that withstands the efforts of more determined pets or children to dislodge or bypass it. This setup is particularly advantageous in environments where the integrity of the Gate 100B is crucial, such as in homes with large dogs or very active children.

Figure 1C:
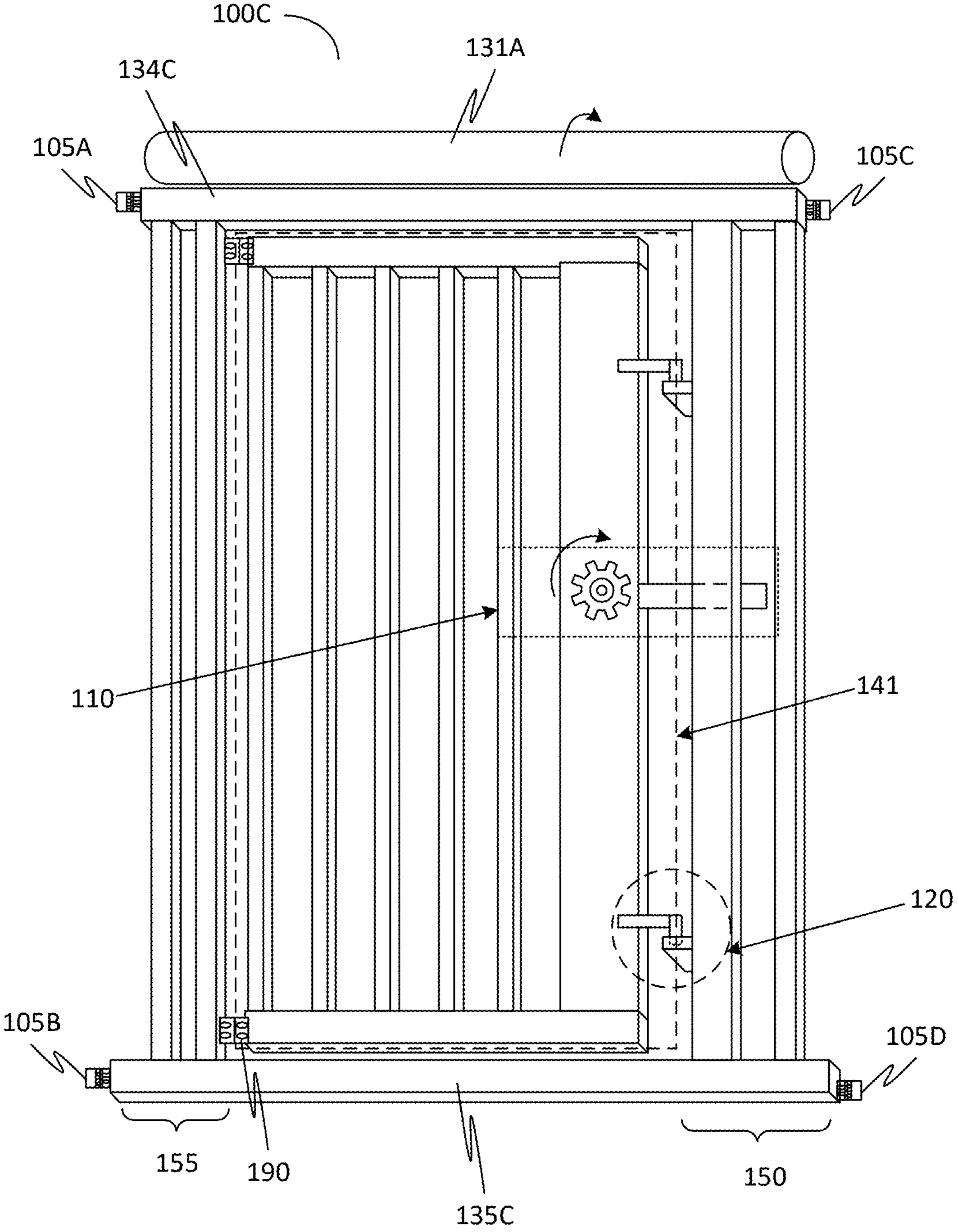
FIGS. 1C-1D illustrate other exemplary variations in a pet and child confinement gate as per some embodiments of the present device.

Referring now to FIG. 1C, an exemplary variation in the design of a pet and child confinement Gate 100C is presented. This version of the Gate 100C features a Gate Frame Portion or Interior Gate 141, which is centrally suspended between structural components including a Left Frame Portion 155, a Right Frame Portion 150, a Top Rail 134C, and a Bottom Rail 135C of the confinement Gate 100C. These elements form a substantial framework that secures the Gate 100C within a designated opening, such as a doorway.

At the top of the Top Rail 134C, a Free-Spinning Roller Mechanism 131A is installed. Both the Top Rail 134C and the Bottom Rail 135C are equipped with Flex Tension Mechanisms 105A to 105D. These Flex Tension Mechanisms 105A to 105D are crucial for the temporary installation of the Gate 100C within a doorway. They allow for quick setup and removal without the need for permanent fixtures. The Flex Tension Mechanisms may typically employ a spring-loaded or screw-tightened system that applies pressure against the walls where the Gate 100C needs to be installed, securing the Gate 100C firmly in place while allowing for adjustments to accommodate different widths of doorways.

Figure 1D:
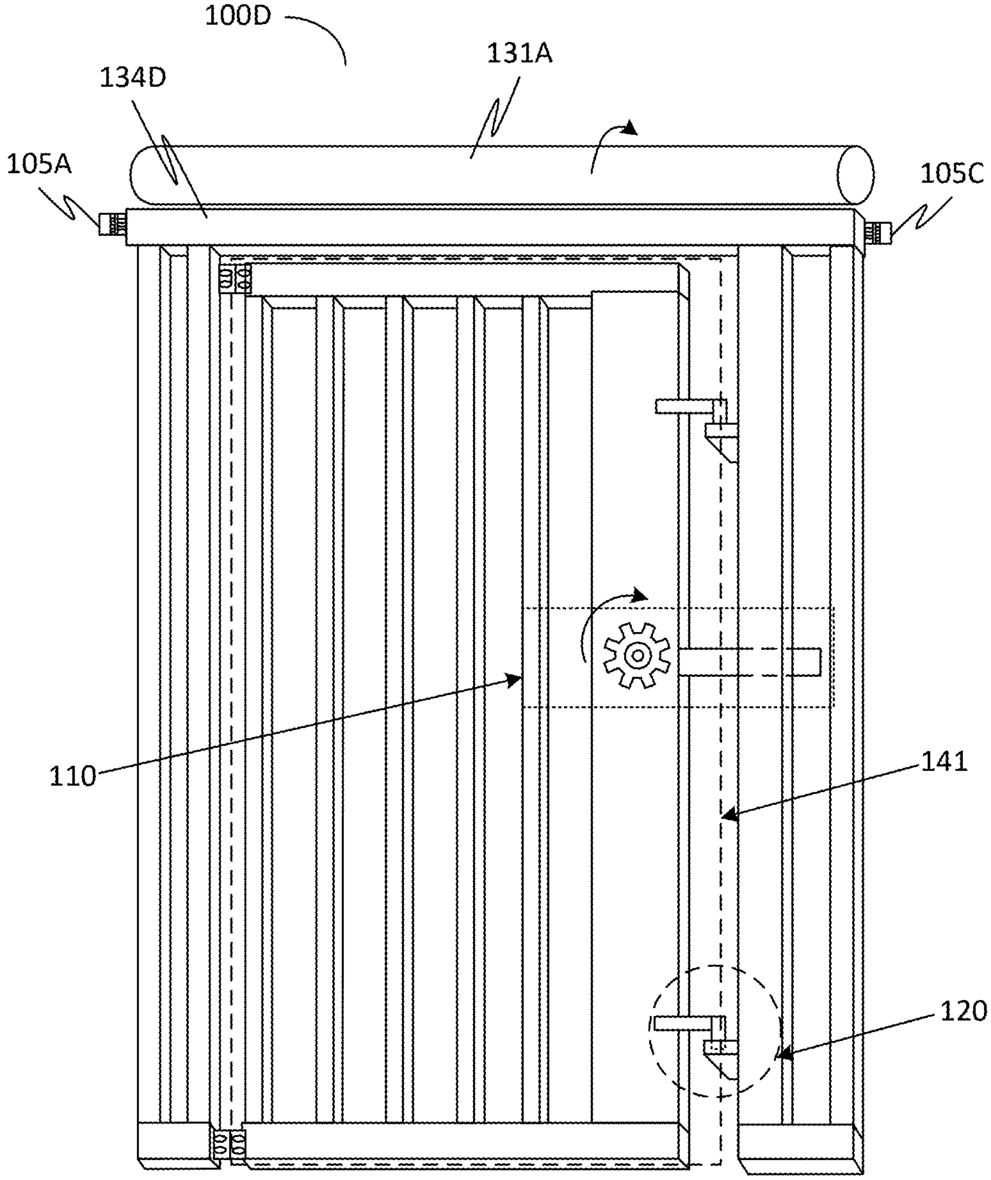

Referring now to FIG. 1D, the diagram illustrates another modified version of the pet and child confinement Gate 100D. This variation, similar to Gate 100C, has been adapted by removing the Bottom Rail to enhance usability and safety. Unlike Gate 100C, the Gate 100D features only a single Top Rail 134D which is equipped with Flex Tension Mechanisms 105A and 105B.

The key distinction in this design is the absence of a Bottom Rail, which significantly reduces the risk of tripping hazards. This structural adjustment means that when the Interior Gate 141 is open, the floor area remains completely unobstructed. This design consideration is especially advantageous in environments where space is limited or where safety is a paramount concern, such as in homes with young children or elderly individuals. By eliminating the bottom rail, the design minimizes the tripping hazard that would traditionally be part of a gate structure for users, particularly those with mobility issues. This feature makes Gate 100D a thoughtful choice for ensuring unimpeded movement through the doorway, contributing to a safer and more accessible environment.

In some embodiments of the present device, other variations in the pet and child confinement gate can also be provided to meet specific user needs or architectural requirements. These variations may include different materials for enhanced durability or aesthetics, such as using lightweight aluminum or visually appealing wood finishes. Additionally, gates can be customized with various decorative patterns or colors to seamlessly integrate into home decor. Security features could also be tailored, such as incorporating advanced locking mechanisms with biometric access controls or connectivity for remote operation via smart home systems. These customizations ensure that the gate not only performs its essential function of safety but also complements the personal style and technological preferences of the user.

Figure 2:
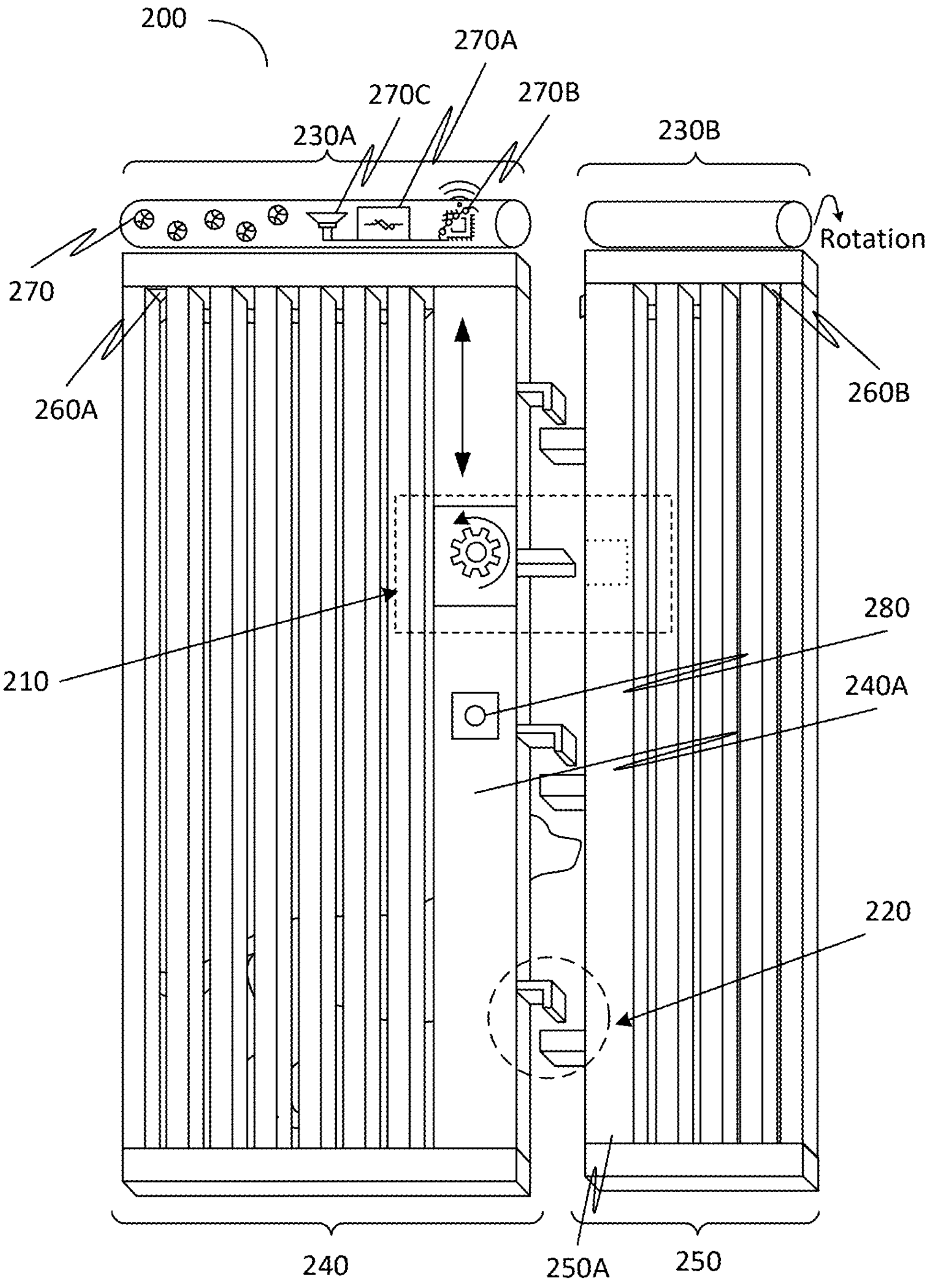
FIG. 2 illustrates an exemplary pet and child confinement gate comprising spinning rollers on top with sensors for quantifying noise or vibration, and communication capabilities, as per some embodiments of the device.

Referring now to FIG. 2, an exemplary pet and child confinement Gate 200 as per some embodiments of the present device is illustrated. The Gate 200 comprises a Primary or First Locking Mechanism 220, similar to the Primary Locking Mechanism 120 as previously described in FIG. 1. This Primary Locking Mechanism 220 involves a drop-in catch that fits into a metal sheath or barrel, securing the Gate 200 and preventing inward and outward movement of the Gate 200. The Gate 200 also includes a Second Locking Mechanism 210, which is similar to the Second Locking Mechanism 110. This Secondary Locking Mechanism comprises a rotatable knob or handle that, when turned, extends a sliding bolt into a receiver hole, preventing the gate from opening and lifting. When the Primary Locking Mechanism 220 is engaged, it prevents inward and outward movement of the Gate 200 even if the Secondary Locking Mechanism 210 is already disengaged.

The Gate 200 also features a free-spinning mechanism with a Single-Piece Hollow Type First Free-Spinning Roller 230A on the Top Rail 260A of the Gate Frame Portion 240 and a Single-Piece Hollow Type Second Free-Spinning Roller 230B on the Top Rail 260B of the Right Frame Portion 250. These First and Second Free-Spinning Rollers 230A-230B are designed to spin freely when pressure is applied, making it difficult for pets or children to climb over the gate. The First and Second Free-Spinning Rollers 230A-230B are a critical component in preventing gate-crossing attempts, utilizing both mechanical and sensory deterrents.

One or both of the First Free-Spinning Roller 230A and the Second Free-Spinning Roller 230B may comprise Loose Objects 270 inside them. These Loose Objects 270 may include small metal balls, plastic pieces, wooden objects, or any other materials capable of creating a loud or scary noise when they collide with the interior surfaces of the hollow First and Second Free Spinning Rollers 230A-230B. When a pet or child applies force to the First or Second Free Spinning Rollers 230A-230B in an attempt to climb over the gate, the Loose Objects 270 inside the First and Second Free Spinning Rollers 230A-230B rotate and collide with the inner surfaces, producing a loud and startling noise. This noise serves to scare and discourage pets or children from continuing their climbing attempts.

In some embodiments, the width of the pet and child confinement Gate 200 can be adjusted to accommodate various doorway sizes and configurations. This adjustability may be achieved through Expandable Top Rails (260A-260B) that can be extended or retracted as needed. In some embodiments, the Top Rails (260A-260B) may feature a telescoping mechanism, allowing them to slide smoothly to a desired width. Once the Top Rails (260A-260B) are adjusted, the vertical frames can be repositioned accordingly to ensure structural integrity and secure attachment.

To facilitate this adjustability, the vertical frames and other components may be designed with modular pieces that can be added or removed as needed. For example, additional vertical frame segments can be attached using screws or nut-bolts, providing a secure and customizable fit. Similarly, the rails and other structural elements may be designed to be easily expandable or retractable, ensuring that the Gate 200 can be precisely adjusted to fit various doorway widths. In some embodiments, the bottom portion or frames of the Gate 200 are constructed to be solid and strong, effectively preventing pets or children from attempting to squeeze through.

In some embodiments, a motor may be connected to one or both of the First and Second Free Spinning Rollers 230A-230B to enhance their deterrent effect. When a gate-crossing attempt is detected, the sensors trigger the motor to rapidly accelerate the rotation of the First and Second Free Spinning Rollers 230A-230B. This sudden increase in speed makes it even more challenging for the pet or child to maintain a grip, effectively deterring the attempt. The rapid spinning not only prevents stable grip or footholds but also creates a dynamic and intimidating barrier, significantly enhancing the effectiveness of the Gate 200. This motorized mechanism ensures that any climbing attempts are promptly and effectively discouraged, providing an additional layer of protection.

In some embodiments, one or both of the First and Second Free Spinning Rollers 230A-230B may include additional sensory deterrents. For example, the First Free-Spinning Roller 230A may be equipped with a Pressure Sensor 270A. This Pressure Sensor 270A detects pressure when a pet places its paw or a child places their hand on the First Free Spinning Roller 230A. When pressure is detected, the Pressure Sensor 270A communicates with an Electronic Chip 270B located within the First Free Spinning Roller. The Electronic Chip 270B may comprise a processor, memory, control logic, and communication circuitry, allowing it to perform various functions in response to the detected pressure.

The Electronic Chip 270B can be communicatively coupled to the Pressure Sensor 270A and an Audio Device 270C. When the Pressure Sensor detects a gate-crossing attempt, the processor and control logic of the Electronic Chip 270B determine that a tampering attempt is occurring. The Electronic Chip 270B may then transmit an alert message to the caretaker's mobile phone, notifying them of the attempt. This alert can be sent via various communication networks, such as cellular networks, home Wi-Fi, or Bluetooth, ensuring that the caretaker is promptly informed regardless of their location.

Upon receiving the alert, the caretaker can take several actions to address the situation. One option is to send a command to the Electronic Chip 270B to play a pre-recorded sound or voice stored in the memory of the Electronic Chip 270B. These sounds or voices may include startling sounds, trainer commands or voices, or any other audio cues that may deter the pet or child from further attempts. The memory storing these sounds can be either integrated within the Electronic Chip 270B or located separately but communicatively connected to it.

In some embodiments of the present device, a remote-controlled gate monitoring system may be specifically designed to enhance security and caregiver interaction by detecting climbing attempts. Such a system may integrate an array of Pressure Sensors 270A and/or motion detectors embedded within the frame of the Gate 200 and/or within the free-spinning mechanisms at the top of the Gate 200. These Pressure Sensors 270A may be calibrated to detect unusual pressures or movements that signify an attempt to climb over or tamper with the gate structure.

The remote monitoring system may be connected to a central processing unit within the Electronic Chip 270B that interprets data from the Pressure Sensor 270A in real time. When climbing attempts are detected, the system triggers an immediate response. This response may include the activation of the gate's built-in vibration deterrents, which generate a strong but harmless vibration along the gate's rollers or free-spinning mechanisms to discourage further climbing attempts. Concurrently, an auditory alarm may be activated, which can be pre-set to play various deterrent sounds ranging from loud alarms to verbal warnings or other frightening sounds, designed to startle and deter the child or pet from continuing their attempt.

Moreover, the central processing unit may be equipped with wireless communication capabilities, allowing it to send real-time alerts to a caregiver's mobile device. These alerts can inform the caregiver of the exact nature of the security breach, including the time and intensity of the detected climbing attempt. A mobile application associated with the Gate 200 may also allow caregivers to remotely view the status of the Gate 200, adjust sensitivity settings of Pressure Sensors 270A, and control the activation or deactivation of all integrated deterrent mechanisms. Additionally, in some embodiments of the present device, the remote monitoring system may be controlled through an infrared or Wi-Fi remote controller. In some embodiments of the present device, the caretaker's mobile phone may function as a remote control.

Now again referring to FIG. 2, in addition to pre-recorded sounds, the caretakers can use their mobile phone's microphone to send real-time voice commands through the Audio Device 270C. This capability allows the caretaker to directly communicate with the pet or child, instructing them to stop their actions. This real-time communication can be particularly effective, as the pet or child can recognize the caretaker's voice, adding an authoritative element to the deterrent. In some embodiments of the device, the pre-recorded sounds can be played automatically through the Audio Device 270C based on detecting the gate-climbing attempt.

Further enhancements to the Electronic Chip 270B may include integration with smart home systems. For example, the Electronic Chip 270B may be connected to a home security system, enabling automated responses such as activating additional alarms, lights, or cameras when a gate-crossing attempt is detected. This integration can provide a comprehensive security solution, combining physical barriers with advanced monitoring and alert capabilities.

The hollow First and Second Free-Spinning Rollers 230A-230B themselves can be designed to accommodate various additional components. Besides the Pressure Sensor 270A and Electronic Chip 270B, the First and Second Free-Spinning Rollers 230A-230B can house other sensors, such as motion detectors. Motion detectors can provide an extra layer of security by detecting any movement near the gate and triggering the alert system. In some embodiments of the device, Cameras 280 may be fastened to the Gate 200 and/or integrated into the Gate 200. Cameras 280 can capture video footage of the gate area, allowing the caretaker to visually monitor any attempts to climb over the Gate 200. In some preferred embodiments, the Cameras 280 may provide image data via wireless communication to a smart device. Additionally, in some embodiments, the Cameras 280 may be removable attached to the Gate 200 such that the Camera 280 may be operated by hand, and/or relocated to another vantage point for operation and image capture.

The communication circuitry within the Electronic Chip 270B can support various communication protocols, ensuring compatibility with different devices and networks. For instance, the Electronic Chip 270B can use Bluetooth for short-range communication with nearby devices, Wi-Fi for broader home network integration, and cellular networks for remote communication. This flexibility ensures that the gate's alert notifications and monitoring system can function effectively in various environments and setups.

To further enhance the gate's functionality, the Electronic Chip 270B can be programmed to learn from repeated attempts. Using machine learning algorithms, the Electronic Chip 270B can analyze patterns in tampering attempts, such as the time of day or specific behaviors exhibited by the pet or child. This data can be used to adjust the gate's responses, such as increasing the sensitivity of the Pressure Sensor 270A or changing the types of sounds played through the Audio Device 270C.

In some embodiments of the present device, the Audio Device 270C may be configured to produce ultrasonic sounds when a gate-crossing attempt is detected. These ultrasonic sounds are specifically designed or selected to be audible and irritating to pets, such as dogs and cats, while remaining inaudible and harmless to humans. The Pressure Sensor 270A detects when a pet places its paws on the Roller 230A, triggering the Electronic Chip 270B to activate the Audio Device 270C.

Ultrasonic sound waves are an effective deterrent because they can create a highly uncomfortable auditory experience for pets without causing any physical harm. The frequency of these sounds may be tailored to be within the hearing range of most common household pets, ensuring that the deterrent is effective. Meanwhile, this sound remains above the threshold of human hearing, ensuring that it does not cause any disturbance to the household occupants. This feature can be particularly useful in households where pets are persistently trying to climb over or tamper with the gate, providing a humane and non-intrusive solution to reinforce boundaries. The Electronic Chip 270B can also store multiple ultrasonic frequencies to avoid pets becoming accustomed to a single sound, thereby maintaining the effectiveness of the deterrent over time.

In some embodiments of the present device, the gate's Frame Portions 240 and 250 may comprise multiple vertical frames, including Interior Frames 240A and 250A. These frames may be designed in various shapes and thicknesses to enhance both the functionality and aesthetic appeal of the gate. The Interior Frames 240A and 250A, which house the critical locking mechanisms and other components, can be thicker and sturdier compared to the other frames to provide additional support and security. This increased thickness ensures that the frames can withstand significant pressure and tampering attempts, thereby enhancing the overall durability and security of the gate.

In some embodiments of the present device, some or all of the vertical and horizontal frames of the gate may be designed as pipes or rods. The use of pipes or rods for the vertical frames provides a sturdy foundation for the gate, ensuring it can withstand the physical demands of everyday use without compromising on safety or functionality. Similarly, incorporating rods or pipes as horizontal rails or frames adds additional strength and stability to the gate. This configuration helps distribute weight and stress more evenly across the structure, reducing the likelihood of deformation under load. Additionally, the rounded surfaces of the rods and pipes can contribute to a smoother operation of any moving parts or mechanisms integrated within the gate, such as sliders or rollers.

The frames can also be constructed in different shapes to suit various design preferences and structural requirements. For example, the frames may be round or pipe-shaped, offering a sleek and modern look that seamlessly blends with contemporary home decor. Alternatively, they may be rectangular or square-shaped, providing a more traditional or industrial appearance. Other possible shapes include oval, hexagonal, or custom designs that cater to specific aesthetic or functional needs. The flexibility in the design of the frames allows for customization to match different interior styles, while ensuring that the gate remains sturdy and secure.

The free-spinning mechanism's design may also be customized to suit different needs. For example, the Rollers 230A-230B can be made from various materials, such as metal, plastic, or wood, depending on the desired durability and aesthetic. The exterior of the Rollers 230A-230B can be coated with slippery materials or coating. Additionally, the Rollers 230A-230B may also be designed with decorative elements or designs to blend seamlessly with home decor, ensuring that the Gate 200 remains functional without compromising the visual appeal of the living space.

In some embodiments, the Gate 200 may be equipped with an integrated lighting system. LED lights can be embedded within the Frame Portions 240-250 or Rollers 230A-230B, providing illumination for better visibility in low-light conditions. These lights may be activated automatically when pressure is detected on the Rollers 230A-230B or manually controlled via a mobile app. The lighting system may also enhance safety by ensuring that the gate area is always well-lit, reducing the risk of accidental trips or falls. In some embodiments of the apparatus, the Rollers 230A-230B can be made from solid light diffuser material so that LED lights placed inside the Rollers 230A-230B are dispersed in all directions. In some embodiments of the device, the LED lights may be freely movable lights inside the hollow Rollers 230A-230B so that when they collide with internal surfaces of the Rollers 230A-230B, they are illuminated, randomly creating a unique lighting pattern and startling the pets or children.

In some embodiments, to ensure the Gate 200 is suitable for outdoor use, weather-resistant materials and coatings can be incorporated. Such an embodiment ensures that the gate remains functional and durable under various weather conditions, such as rain, snow, and extreme temperatures. Weather-resistant seals and corrosion-resistant metals can be used to enhance the longevity of the gate, making it a versatile solution for both indoor and outdoor environments.

Another unique feature that may be incorporated into the Gate 200 is an integrated temperature sensor. This sensor can monitor the temperature around the gate and alert the caretaker if it exceeds or drops below a certain threshold. This feature can be particularly useful in homes with pets, ensuring that the environment remains comfortable and safe for them. The temperature data can also be used to control connected HVAC systems, maintaining optimal conditions in the home.

The gate's electronic components may also include a battery backup system, ensuring that the gate remains operational even during power outages. Rechargeable batteries can be integrated into the rollers, providing power to the sensors, electronic chip, and communication circuitry. The battery system can be designed to automatically recharge when the gate is connected to a power source, ensuring continuous operation without the need for frequent manual recharges.

The versatility of the Gate 200 extends to its installation options. The Gate 200 may be designed for both permanent and temporary installations. For permanent setups, the Gate 200 can be securely mounted to walls using screws and brackets, ensuring maximum stability. For temporary installations, tension mounts can be used, allowing the Gate 200 to be easily moved and adjusted without damaging the walls. This flexibility makes the gate suitable for various living situations, such as rental homes or temporary confinement needs.

In terms of aesthetics, the Gate 200 can be customized with various finishes and colors to match the home's interior design. Options may include wood grain finishes for a traditional look, metallic finishes for a modern appeal, and various color options to blend seamlessly with the existing decor. Customizable panels and decorative elements can be added to the frame, allowing users to personalize the gate according to their preferences.

To further enhance user convenience, the Gate 200 can be integrated with voice control systems such as Amazon Alexa or Google Assistant. This integration may allow users to control the Gate 200 using voice commands, making it easy to lock, unlock, or adjust settings without needing to physically interact with the Gate 200. Voice control may be particularly useful when the user's hands are occupied or when quick adjustments are needed. In some embodiments of the device, the voice commands can be used to record the trainer's voice in the memory inside the Rollers 230A-230B without dismantling the Rollers 230A-230B.

In some embodiments of the present device, the Rollers 230A-230B may comprise vibration and/or shock elements that activate when a gate-tampering or crossing attempt is detected. These elements may be integrated within the rollers and are designed to provide a harmless but effective deterrent. When pressure is applied by a pet or child attempting to climb over the gate, sensors embedded in the Rollers 230A-230B detect the attempt and trigger the vibration or shock elements. The vibration can create an uncomfortable sensation that discourages the pet or child from continuing their climbing effort. Similarly, in some embodiments, a very mild shock, calibrated to be safe yet startling, can provide an additional layer of deterrence, reinforcing the message that the Gate 200 should not be tampered with.

These vibration and shock elements can be controlled by the Electronic Chip 270B housed within the Rollers 230A-230B. The Electronic Chip 270B may be programmed to activate the deterrent mechanisms only when specific conditions are met, ensuring that accidental activations are minimized. Additionally, the Electronic Chip 270B may communicate with a mobile app, allowing caregivers to adjust the sensitivity of the sensors, monitor the status of the Gate 200, and receive alerts in real time. This integration of advanced deterrent technologies not only enhances the effectiveness of the Gate 200 but also provides caregivers with the tools to customize and manage the security features of the Gate 200, according to their needs. In some embodiments, the vibration deterrent may be mechanically generated using spring-loaded, gear-based, or lever-based mechanisms.

Figure 3:
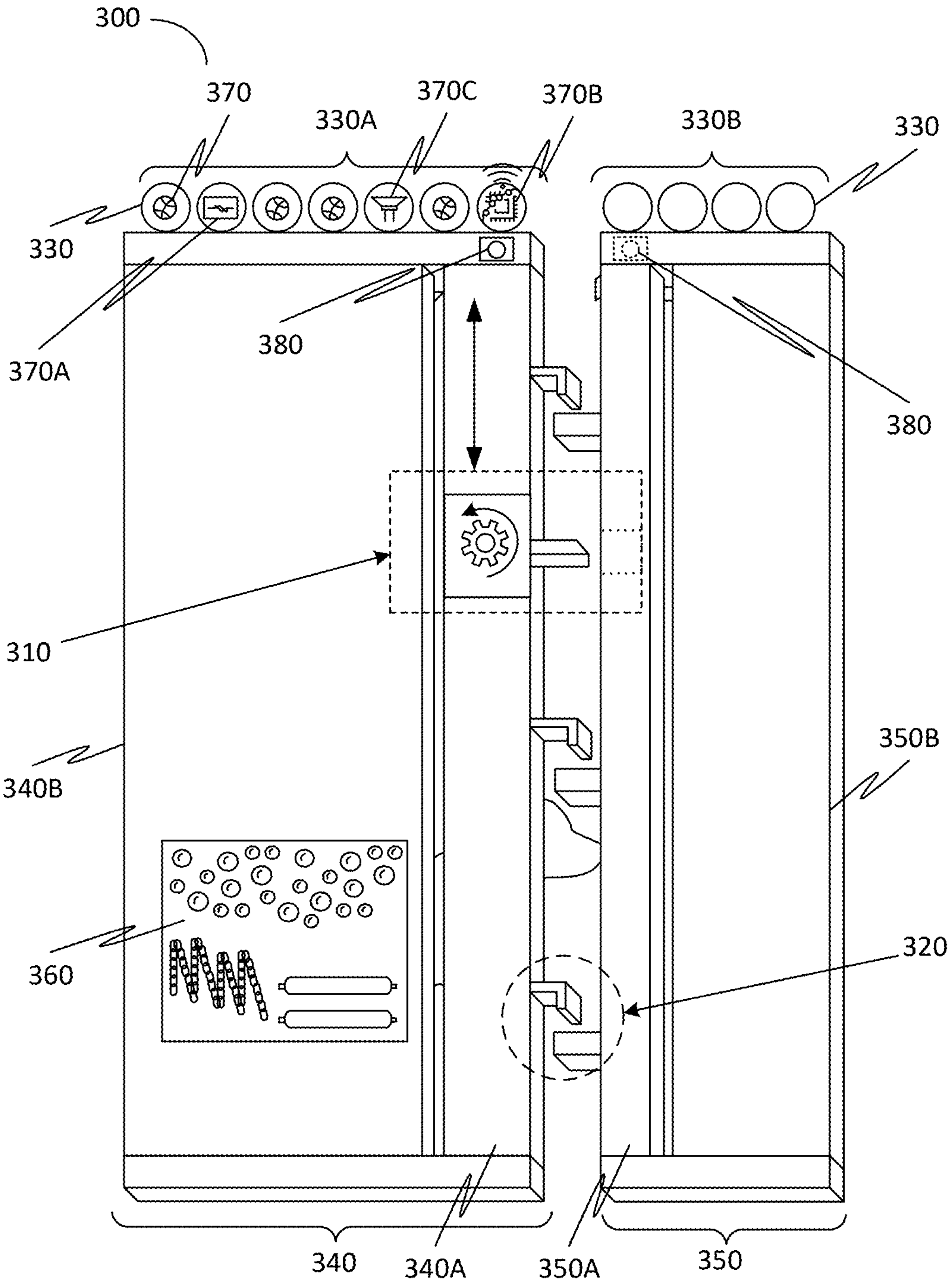
FIG. 3 illustrates an exemplary pet and child confinement gate with a ball-bearing mechanism on top with sensing, noise or vibration, and communication capabilities, as per some embodiments of the device.

Referring now to FIG. 3, an exemplary pet and child confinement Gate 300, as per some embodiments of the present apparatus, is illustrated. This Gate 300 is similar to the previously described gates but includes some unique features and enhancements. The Gate 300 comprises a First Locking Mechanism 320 and a Second Locking Mechanism 310, for enhanced security and prevention of unauthorized operation. The Second Locking Mechanism 310 operates in a manner similar to the Second Locking Mechanism 110, involving a rotatable knob or handle that extends a sliding bolt into a receiver hole when rotated, thereby locking the gate securely. The Primary or First Locking Mechanism 320 involves a drop-in catch that fits into a metal sheath or barrel.

A notable difference in this embodiment is the replacement of the free-spinning Rollers 230A-230B with Ball-Bearing Mechanisms 330A-330B. These Ball-Bearing Mechanisms 330A-330B comprise multiple Metal Balls 330, which may either be hollow or solid. When these balls are hollow, they can accommodate Loose Objects 370 inside them. These Loose Objects 370, which may be small metal pieces, compressible objects, plastic bits, or other materials, create noise when the Metal Balls 330 rotate. This noise serves to startle and discourage pets or children from attempting to climb over the Gate 300, leveraging the auditory deterrent to enhance the security features of the Gate 300.

The Ball-Bearing Mechanisms 330A-330B may be situated on the top rails of the Gate Frame Portion 340 and the Right Frame Portion 350, respectively. These Frame Portions 340-350 may comprise Flat Single Frames or Sheets 340B-350B, instead of multiple vertical frames, providing a sleek and modern design. These Single Frames or Sheets 340B-350B offer a large surface area, which can be advantageous for integrating additional features such as sensors and electronic components. In some embodiments, the Ball-Bearing Mechanisms 330A-330B may comprise bladders that compress under pressure, creating noise to deter climbing attempts.

In some embodiments of the present apparatus, the Flat Single Frame Sheets 340B and 350B of the Gate 300 may be designed to be either opaque or transparent, depending on the user's preference and functional requirements. For instance, the Flat Single Frame Sheets 340B and 350B may be made from solid glass or durable acrylic materials, providing a transparent barrier that allows caregivers to see through the Gate 300. This transparency is particularly beneficial in households where visual monitoring of pets or children is crucial. The transparent design ensures that while the pet or child is securely confined, the caregiver can easily observe their activities and ensure their safety without opening the gate.

Alternatively, the Flat Single Frame Sheets 340B and 350B may be opaque, made from materials such as metal, wood, or high-quality plastic. Opaque sheets provide a sense of privacy and can be chosen to match the interior decor of the home, offering both functionality and aesthetic appeal. For example, opaque metal sheets can give the gate a modern, industrial look, while wooden sheets can provide a warm, traditional appearance. The choice between opaque and transparent frame sheets allows for customization according to the specific needs and preferences of the household, enhancing both the security and visual integration of the gate within the living space.

The Interior Frames 340A and 350A house the essential locking mechanisms and other critical components. The Metal Balls 330 in the Ball-Bearing Mechanisms 330A-330B may either be separated by minimal distances or be in direct contact with each other. When the Metal Balls 330 are in contact with each other, the rotation of one ball may cause the others to rotate as well, making the entire Ball-Bearing Mechanism 330A-330B rotate smoothly. This interconnected movement ensures that any pressure applied by a pet or child attempting to climb the gate will cause the balls to spin, thereby making it difficult to gain a foothold.

To further enhance the security features, the Gate 300 may include a Pressure Sensor 370A, which may also comprise a motion sensor. This Pressure Sensor 370A detects any attempt to climb or tamper with the Gate 300 and sends signals to the Communication Chip 370B. The Communication Chip 370B may be equipped with advanced electronic components, including a processor, memory, control logic, and communication circuitry. This Communication Chip 370B may wirelessly be connected to various communication networks such as cellular networks, home Wi-Fi, or Bluetooth, ensuring that alerts and notifications can be sent to the caretaker's mobile device in real time.

An Audio Device 370C, such as a sound speaker or a piezo electric device, may be integrated into the Ball Bearing Mechanism 330A-330B to provide auditory deterrents. Upon detecting a gate-crossing attempt, the Pressure Sensor 370A activates the Communication Chip 370B, which may trigger the Audio Device 370C to produce audio that is unexpected and unpleasant, such as loud noises or ultrasonic sounds. Ultrasonic sounds are particularly effective because they are audible to pets but inaudible to humans, providing a humane and non-intrusive way to deter pets from climbing the Gate 300. A user, such as a caretaker can also customize the sounds played through the Audio Device 370C, either by selecting from pre-recorded sounds stored in the Communication Chip's memory or by using their mobile device to send real-time voice commands.

The electronic and sensory components may be housed within a single Ball 330 in the Ball-Bearing Mechanisms 330A-330B or distributed across multiple Balls 330. If distributed, these components may be communicatively coupled to each other, ensuring seamless coordination and functionality. For example, the Pressure Sensor 370A may be located in one Ball 330, while the Communication Chip 370B and Audio Device 370C are in other Balls 330, all working together to detect and respond to tampering or crossing attempts.

In some embodiments, one or more Toys 360 may be removably fastened to the Gate 300. The Toys 360 may keep the pet or child occupied and distracted from attempting to escape, and are preferably removable by the pet or child, so that the pet or child may easily detach the Toys 360 from the Gate 300 without pulling the Gate 300 from its installed location. Toys may include, by way of non-limiting example, one or more of: chew toys, ropes, balls, animal dolls, sliding knobs, balls, and levers, and the like. The Toys 360 may be attached via one or more removable fasteners, such as hook and loop, snaps, magnets, or other devices that are not harmful to the pet or child.

One or more Cameras (or other image capture device) 380 may capture image data of a pet playing with the Toys 360, or during another activity within a field of view of the Camera 380 that is proximate to the Gate 300 and capable of image data capture by the Camera 380.

In addition to these features, the Gate 300 may be integrated with smart home systems, allowing for automated responses and enhanced monitoring capabilities. For instance, the Gate 300 may be connected to a home security system, triggering additional alarms or cameras when tampering or gate-crossing attempt is detected. This integration provides a comprehensive security solution, combining physical barriers with advanced electronic monitoring and alert systems.

The design of the Gate 300 also allows for flexibility in the materials and finishes used. The Frame Portions 340 and 350 can be made from various materials such as metal, plastic, or wood, depending on the desired durability and aesthetic. The surfaces of the frames can be coated with non-slip materials to ensure safety and prevent accidental injuries. Additionally, the gate can be customized with different colors, patterns, and decorative elements to match the home decor, providing both functionality and aesthetic appeal.

The Ball-Bearing Mechanisms 330A-330B not only enhance the security features of the Gate 300 but also add to its durability. Metal Balls 330 are highly resistant to wear and tear, ensuring that the Gate 300 remains functional and effective over time. The hollow design of the Balls 300 allows for the integration of various sensory and electronic components without compromising the structural integrity of the Gate 300.

For ease of installation, the Gate 300 may be designed to accommodate both permanent and temporary setups. Permanent installations can use screws and brackets to secure the gate to the walls, ensuring maximum stability. Temporary installations may use tension mounts, allowing the Gate 300 to be easily moved and adjusted without damaging the walls. This flexibility makes the Gate 300 suitable for different living situations, such as rental homes or temporary confinement needs.

The integration of advanced technology and customizable design elements makes the Gate 300 a versatile and user-friendly solution for modern homes. The combination of mechanical deterrents, such as the Ball-Bearing Mechanisms 330A-330B, and electronic deterrents, such as the Pressure Sensors 370A and Audio Devices 370C, provides a comprehensive approach to preventing tampering and climbing attempts. This multi-layered security ensures that the Gate 300 remains effective in various scenarios, providing peace of mind to caregivers.

The pet and child confinement Gate 300 combines mechanical and electronic deterrents to prevent climbing and tampering. The First Locking Mechanism 320 and Second Locking Mechanism 310 ensure robust security, while the Ball-Bearing Mechanisms 330A-330A equipped with sensory and electronic components provide advanced monitoring and alert capabilities. The design of the Gate 300 accommodates various enhancements, such as customizable materials and finishes, smart home integration, and battery backup systems, making it a versatile and user-friendly solution for modem homes. By integrating advanced technology and user-friendly features, the present device significantly improves the efficacy and convenience of traditional pet and child gates, offering a reliable and practical solution for modem homes.

Figure 4:
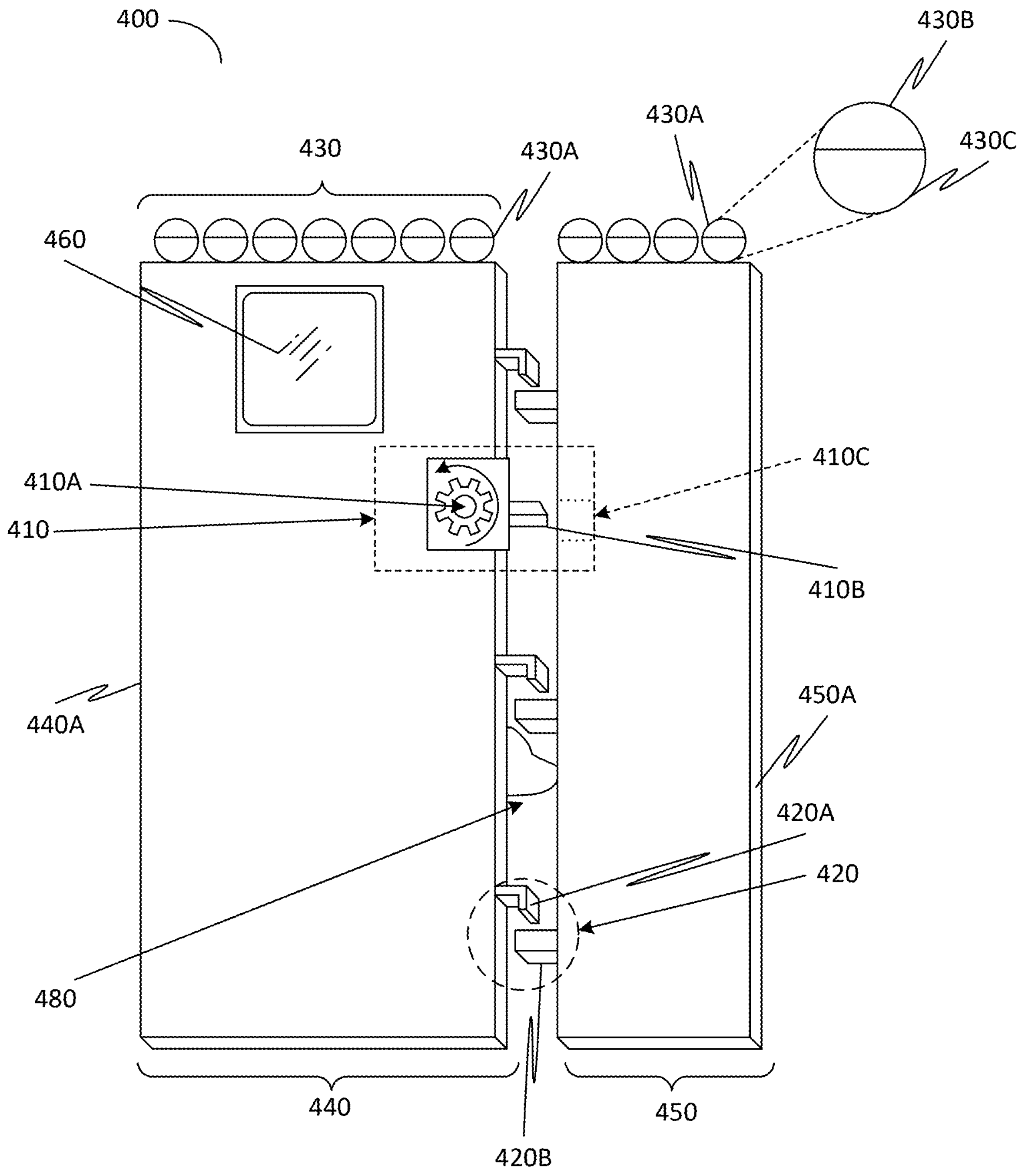
FIG. 4 illustrates an exemplary pet and child confinement gate comprising smooth, flat sheets instead of multiple vertical frames in gate frame portions.

Referring now to FIG. 4, a sophisticated pet and child confinement Gate 400 as per some exemplary embodiments of the present device is illustrated. This Gate 400 is designed to provide maximum security while being user-friendly and versatile in various home settings. The Gate 400 comprises two main locking mechanisms: a First Latching/Locking Mechanism 420 and a Second Latching/Locking Mechanism 410, both crucial for ensuring the Gate 400 remains securely closed and resistant to tampering.

The Second Locking Mechanism 410 includes a Rotatable Knob 410A, a Sliding Bolt 410B, and a Cavity 410C. When the Rotatable Knob 410A is rotated in a first direction, the Sliding Bolt 410B slides into the Cavity 410C, securing the Gate 400 in the closed position. This mechanism is designed to be easily operated with one hand, providing convenience for caregivers who may be carrying items or attending to other tasks. The precision engineering of the Sliding Bolt 410B and Cavity 410C ensures a tight fit, preventing the Sliding Bolt 410B from being easily dislodged by pets or children attempting to open the Gate 400. The well-built construction of this mechanism ensures that it can withstand repeated use without wearing out, maintaining its effectiveness over time.

The First Locking Mechanism 420 comprises a Drop-In Catch 420A and a Metal Sheath 420B. The Metal Sheath 420B has a hole that accommodates a portion of the Drop-In Catch 420A, putting the First Locking Mechanism 420 in the engaged position. This First Locking Mechanism 420 provides a primary layer of security, ensuring that even if the Second Locking Mechanism 410 is somehow bypassed, the Gate 400 remains closed. The Drop-In Catch 420A may be designed to fit snugly into the hole formed in the Metal Sheath or Barrel 420B, and the materials used in its construction may be chosen for their strength and durability. The design ensures that the Gate 400 cannot be easily pried open, adding to the overall security of the Gate 400.

The Gate 400 further comprises a Gate Frame Portion 440 and a Right Frame Portion 450. In this embodiment, both the Gate Frame Portion 440 and the Right Frame Portion 450 comprise Single Sheets 440A and 450A instead of multiple vertical frames. The use of Single Sheets 440A and 450A may provide a sleek and modern appearance, and these Single Sheets 440A and 450A can be either opaque or transparent, depending on user preference. For example, opaque sheets may be made of durable materials like metal or high-density plastic, providing a solid barrier that pets and children cannot see through. Transparent sheets may be made of materials like tempered glass or acrylic, allowing for visibility while still providing a strong barrier. The transparent option is particularly useful for caregivers who want to monitor pets or children without needing to open the Gate 400.

In some embodiments of the present disclosure, the Frame Sheets 440A and 450A may be coated with either whiteboard or blackboard finishes. This innovative feature transforms the gate surfaces into interactive and educational spaces for children, allowing them to express their creativity and practice writing or drawing in a fun, engaging manner.

The whiteboard coating on the frame sheets enables children to use erasable markers to draw or write, offering a reusable canvas that can be wiped clean effortlessly. Alternatively, the blackboard finish accommodates chalk, providing a classic and tactile drawing experience. Chalk drawings can be easily erased, allowing children to start anew with minimal effort. This feature not only keeps young minds entertained but also helps in developing fine motor skills and artistic inclinations.

At the top of the Gate 400 is a Ball-Bearing Mechanism 430, comprising multiple Balls 430A. Each of these Balls 430A may comprise Rotatable Balls 430B held within Ball-Holding Cups 430C. The Ball Holding Cups 430C may be designed to securely hold the Balls 430A while allowing them to rotate freely when a force is applied. This mechanism is essential for preventing pets or children from climbing over the Gate 400. As they attempt to climb, the Balls 430A rotate, making it difficult to gain a stable grip, thereby deterring climbing attempts.

The Ball Holding Cups 430C may be fixedly attached to the top portions of the Gate Frame Portion 440 and Right Frame Portion 450. If the Frame Portions 440A-450A and the Ball-Holding Cups 430C are metallic, the Ball Holding Cups 430C can be soldered to the top portions of the Frame Portions 440A-450A, ensuring a strong and permanent attachment. Alternatively, the Ball Holding Cups 430C may be removably attached using screws, providing flexibility in the number of rotatable balls used. This screw-in design allows for easy maintenance and customization, enabling users to add or remove Balls 430A as needed to adjust the level of security.

The Ball-Bearing Mechanism 430 may provide a flexible deterrent against climbing. The Rotatable Balls 430B may be made from various materials, such as metal, plastic, or composite materials, depending on the required durability and environmental conditions. The choice of materials can also affect the weight and ease of rotation of the Balls 430B, allowing for customization based on the specific needs of the household.

Additionally, the Balls 430B within the Ball-Bearing Mechanism 430 may be hollow and filled with Loose Objects 370, similar to the previous embodiments. These Loose Objects 370 can create noise when the Balls 430B rotate, serving as an auditory deterrent to climbing attempts. The noise can startle pets and children, making them less likely to attempt to climb the Gate 400 again. This feature may particularly be effective in conjunction with the mechanical deterrents provided by the Locking Mechanisms 410 and 420.

To further enhance the functionality of the Gate 400, the Ball-Bearing Mechanism 430 may incorporate sensory and electronic circuitry. For instance, one or more of the Balls 430B can contain a pressure sensor, motion sensor, communication chip, and audio device. These components can work together to detect tampering attempts and respond accordingly. When the pressure sensor detects a force applied to the ball, it can trigger the communication chip to send an alert to the caregiver's mobile device. The audio device can then emit a sound to deter the pet or child from continuing their climbing attempt. This combination of mechanical and electronic deterrents provides a comprehensive approach to security.

In some embodiments, the electronic circuitry may include advanced features such as machine learning algorithms that adapt to repeated tampering attempts. The system can learn the typical behaviors of the pets or children and adjust its sensitivity and response accordingly. For example, if the system detects frequent tampering at certain times of the day, it can increase the sensitivity of the sensors during those times or change the sounds emitted by the audio device to maintain effectiveness.

The Frame Sheets 440A and 450A offer additional customization options. Besides being opaque or transparent, these Frame Sheets 440A and 450A may be treated with various finishes to enhance their appearance and functionality. For example, opaque sheets may be powder-coated in different colors to match the home decor or treated with anti-scratch and anti-graffiti coatings to maintain their appearance over time. Transparent sheets may be treated with UV-resistant coatings to prevent discoloration from sunlight and anti-fingerprint coatings to keep them clean and clear.

The Gate 400 may also be integrated with smart home systems, allowing for advanced monitoring and control. The electronic components can connect to home security systems, enabling features such as remote locking and unlocking, real-time notifications, and integration with other security devices like cameras and motion detectors. This integration provides a comprehensive security solution that enhances the safety and convenience of the Gate 400.

In some embodiments of the present device, the Gate 400 may be equipped with a Display Screen 460 (e.g. a liquid-crystal display (LCD) Light-emitting diode (LED) backlit LCD; Thin-film transistor (TFT) LCD; Quantum dot (QLED) display; light-emitting diode (LED) display; OLED display; AMOLED display; super AMOLED display; or other electronic visual display).

The Display Screen 460 may be placed in logical communication with one or both of a camera, and communication transceiver, enabling a caretaker, a user, an owner, or other interested party, to visually monitor and communicate with pets and/or children from a remote distance. Such a system can facilitate real-time interaction through a built-in camera and microphone, allowing for two-way audio and video communication.

The Display Screen 460, possibly integrated into the upper section of the Gate Frame Portion 440 for easy visibility, may be operative via a user command to display a live video feed of the area immediately beyond the Gate 400. This setup not only enhances security by allowing continuous visual monitoring but also provides a comforting presence for children or pets who can see and hear their caretaker or family member. The communication feature can be particularly useful in situations where a child or pet needs calming or reassurance, making it easier for adults to manage situations remotely without needing to physically open the Gate 400. This interactive feature leverages technology to add an extra layer of functionality and convenience to the Gate 400 system.

Figure 5A:
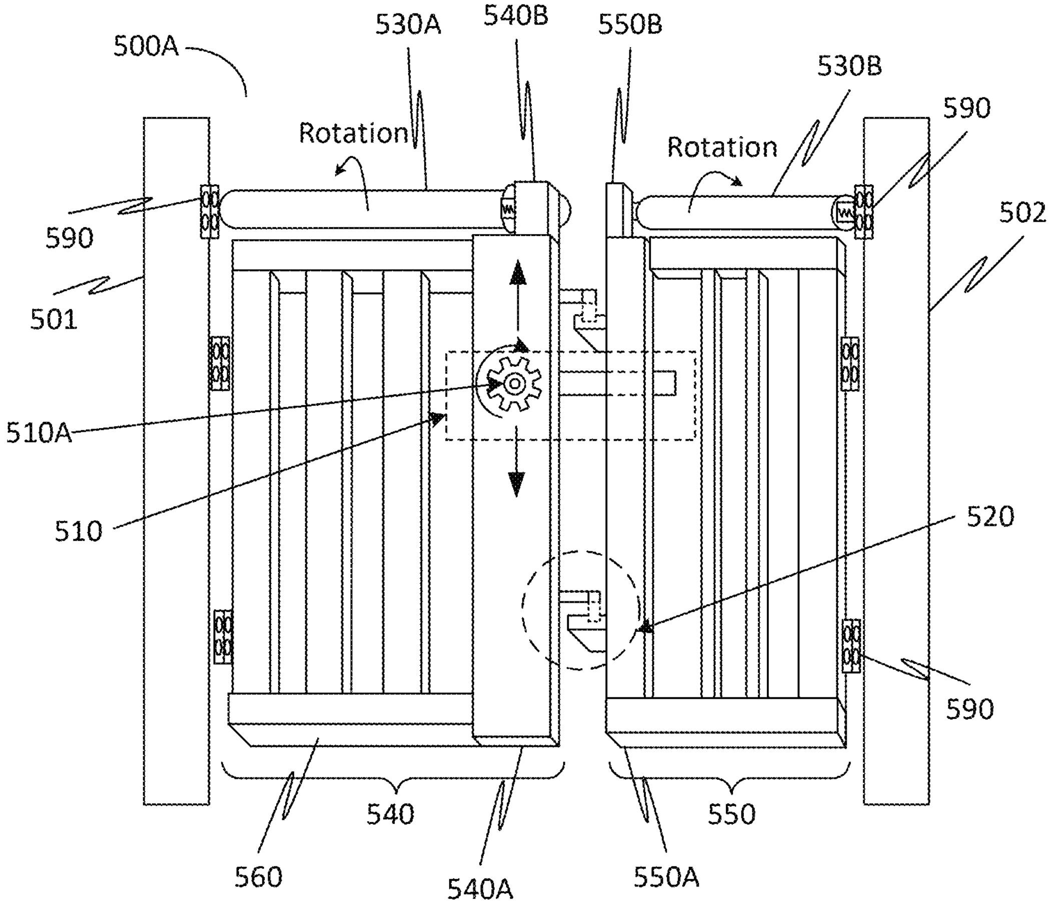
FIG. 5A illustrates an exemplary gate comprising rollers on top in accordance with some embodiments of the present device.

Referring now to FIG. 5A, an exemplary Gate 500A, in accordance with some embodiments of the present disclosure, is illustrated. This Gate 500A is designed to provide secure confinement for pets and children while offering ease of use and flexibility in operation. The Gate 500A features a First or Primary Locking Mechanism 520 and a Second Locking Mechanism 510, both helpful for maintaining the security of the Gate 500A and preventing unauthorized access as discussed in other embodiments of the present disclosure.

A Gate Frame Portion 540 and a Right Frame Portion 550 of the Gate 500A are fixed to Doorway Walls 501 and 502 through Hinges 590. These hinges may be designed to allow both inward and outward movement of the gate, providing flexible access. Additionally, the Hinges 590 may allow for marginal lifting of the Gate Frame Portion using a Knob 510A. This lifting capability is essential for disengaging the Primary Locking Mechanism 520, enabling the Gate 500A to swing open in either direction. The Hinges 590 are constructed from high-quality materials to ensure smooth operation and longevity, even with repeated use.

In some embodiment of the present device, for a Gate 500A that is directly attached to the wall with Hinges 590, the Gate 500A nearly matches the size of the doorway to maximize the barrier's effectiveness. Such setup ensures minimal gaps, enhancing the security and functionality of the Gate 500A. The Right Frame Portion of the Gate 500A, which houses the slide bolt-receiving frame, may be relatively narrow, for example, just a couple of inches wide. The non-moving Right Frame Portion 550 may be securely fixed to the wall without the use of Hinges 590, thereby adding strength and stability to the assembly.

The Gate Frame Portion 540 may also include a Bottom Rail 560, which provides additional strength and stability to the Gate 500A. This Bottom Rail 560 helps to distribute the load evenly and prevents sagging, ensuring that the Gate 500A remains functional and secure. The Right Frame Portion 550 of the Gate 500A may also include a similar Bottom Rail 560A for enhanced structural integrity. The use of Bottom Rails 560 and 560A may ensure that the Gate 500A can withstand the pressures of daily use, maintaining its effectiveness over time.

The top of the Gate 500A may comprise Rollers 530A and 530B, which may be mounted on the top rails of both the Left and Right Frame Portions 540 and 550. Roller 530A may be connected to an Extended Piece 540B of the Left Interior Frame 540A through screws or nut-bolts, providing a secure attachment. Similarly, Roller 530B may be connected to an Extended Piece 550B of the Right Interior Frame 550A in the same manner. These Rollers 530A and 530B may be designed to rotate freely, making it difficult for pets or children to climb over the Gate 500A. Additionally, Roller 530A may be attached to the Wall 501 and Roller 530B may be attached to the Wall 502 through Hinges 590, allowing for the marginal lifting of the Gate Frame Portion 540 along with Roller 530A itself, thereby facilitating the disengagement of the Primary Locking Mechanism 520. The Rollers 530A and 530B may be made from various materials, such as metal, plastic, or composite materials, depending on the desired durability and environmental conditions.

In some embodiments of the present device, the Rollers 530A and 530B may be affixed to the top frames of the Gate500A only (as shown in FIG. 1B) and are not connected to the Walls 501 and 502 through the use of Hinges 590. Such configuration ensures that the Rollers 530A and 530B function solely as components of the Gate 500A, enhancing its maneuverability and smooth operation without imparting any movement or stress to the Walls 501 and 502.

The Extended Pieces 540B and 550B may also include rotatable Balls (e.g. 330 in FIG. 3) on their top surfaces. These Balls 330 further enhance the security of the Gate 500A by providing an additional deterrent to climbing, effectively preventing any foothold. When a pet or child attempts to climb over the Gate 500A, the Balls 330 rotate, making it difficult to gain a stable grip and thereby discouraging further attempts. The use of rotatable Balls 330 adds another layer of protection, ensuring that the gate remains effective in preventing gate-climbing attempts. In some embodiments, the Rollers 530A and 530B may be equipped with internal sensory and electronic components as discussed in several embodiments of the present device. In some embodiments, spherical ball-bearings may be provided at corners of the Gate 500A. In some embodiments, the Extended Pieces 540B and 550B are very thin, so they do not provide grip or support to pets and children.

The Frame Portions 540 and 550, along with their respective Extended Pieces 540B-550B and Rollers 530A-530B, may be designed for easy installation and maintenance. The use of screws or nut-bolts for attachment allows for quick assembly and disassembly, making it convenient for users to install the Gate 500A in various locations or move it as needed. The materials used for the Frame Portions 540 and 550 and Rollers 530A and 530B may be chosen for their durability and resistance to wear and tear, ensuring that the Gate 500A remains functional and effective over time.

Figure 5B:
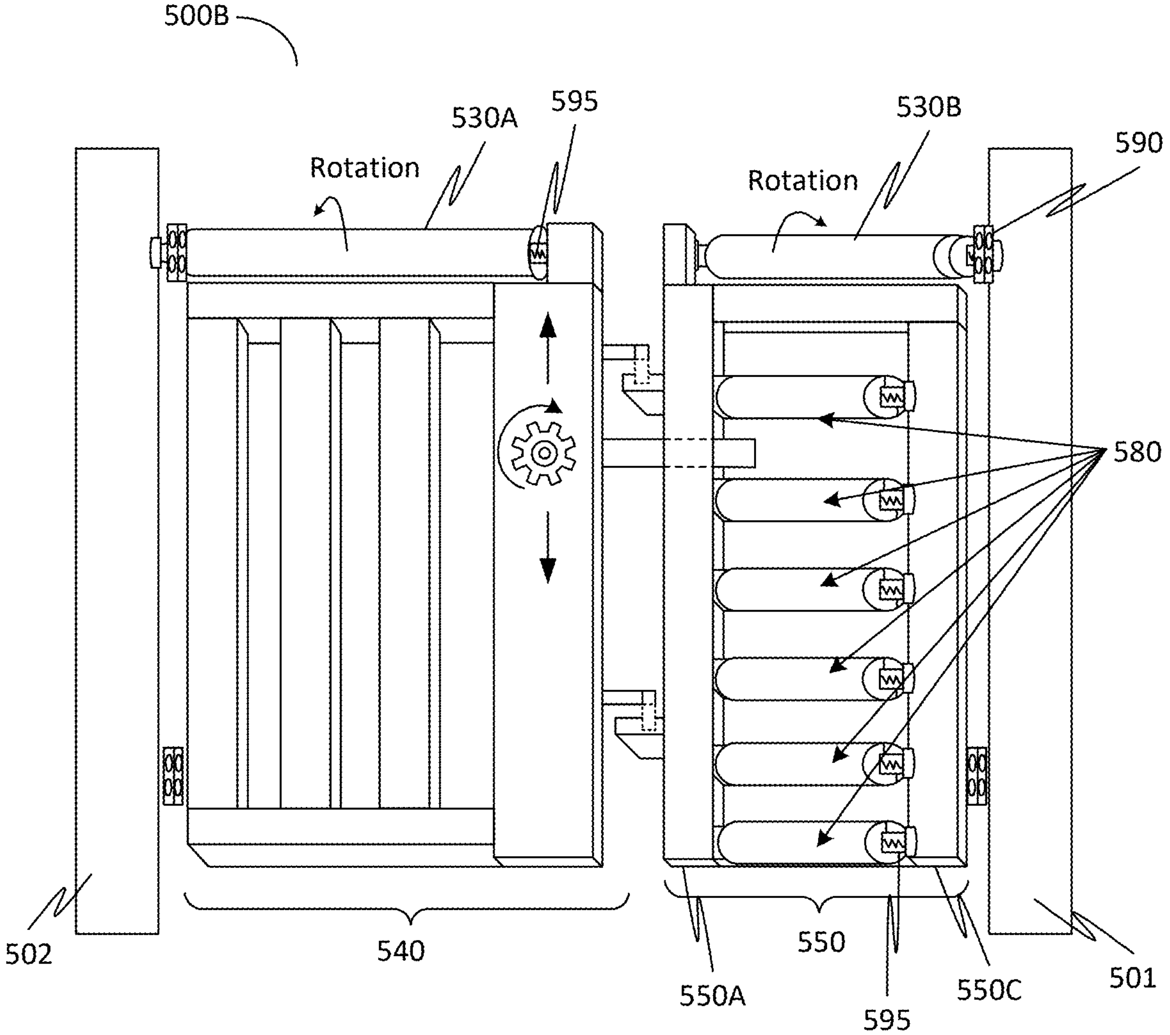
FIG. 5B illustrates an exemplary gate comprising horizontal rollers instead of vertical frames in accordance with other embodiments of the present device.

Referring now to FIG. 5B, an advanced and secure pet and child confinement Gate 500B designed to prevent climbing and unauthorized access while ensuring ease of use is illustrated in some embodiments of the present device. The Gate 500B may incorporate several innovative features to enhance its functionality and security. The Gate 500B may include Rollers 530A and 530B mounted on the top rails of the Gate Frame Portion 540 and the Right Frame Portion 550, respectively. These Rollers 530A and 530B facilitate the anti-climbing functionality of the Gate 500B.

The Rollers 530A and 530B may be connected to the Walls 501-502 through Hinges 590. These Hinges 590 may allow for both rotational and slight vertical movement, which facilitates the engagement and disengagement of the locking mechanisms. Additionally, the Rollers 530A and 530B may be connected to extended pieces of the Left and Right Interior Frames 540A and 550A of the Frame Portions 540 and 550 through Screws 595. This secure attachment ensures that the Rollers 530A and 530B remain firmly in place, even under the force of pets or children attempting to climb the gate.

One unique aspect of this embodiment is the use of Horizontal Rollers 580 within the Right Frame Portion 550 instead of traditional vertical frames. Horizontal bars in a frame might typically provide better grip or footholds for climbing, but in this design, the Horizontal Rollers 580 serve a dual purpose. These Rollers 580 are similar to the top Rollers 530A and 530B in that they rotate freely when a climbing attempt is made. This rotation prevents pets or children from gaining a stable grip, effectively deterring them from climbing over the Gate 500B. The Horizontal Rollers 580 are connected to the Interior Right Frame 550A and the Exterior Right Frame 550C through Screws 595, ensuring secure attachment and smooth operation.

The Gate Frame Portion 540 may also comprise similar Horizontal Rollers 580 in some embodiments of the present device. This design consistency across both Frame Portions enhances the overall anti-climbing functionality of the Gate 500B. The use of Horizontal Rollers 580 instead of vertical frames provides a sleek and modern appearance while maintaining the security features essential for a confinement gate.

The inclusion of Horizontal Rollers 580 in the design of the Gate 500B adds a unique and effective dimension to the anti-climbing strategy. These Horizontal Rollers 580 not only prevent climbing but also enhance the aesthetic appeal of the Gate 500B by providing a streamlined look. The materials used for the Horizontal Rollers 580 can vary, including metal, plastic, or composite materials, chosen for their durability and resistance to wear and tear. The Horizontal Rollers 580 may be designed to withstand repeated climbing attempts, ensuring long-term effectiveness.

Furthermore, the Hinges 590 that connect the Rollers 530A and 530B to the Walls 501-502 facilitate operation of the Gate 500B. These Hinges 590 may allow for the marginal lifting of the Gate Frame Portion 540 when the Knob 510A is lifted, facilitating the disengagement of the locking mechanisms and allowing the Gate 500B to swing open in either direction. This feature is particularly useful for caregivers who need to open the Gate 500B with one hand while carrying items or attending to other tasks. The Rollers 530A and 530B, along with the Horizontal Rollers 580, may be equipped with internal sensory and electronic components in some embodiments. In some embodiments, the Rollers 530A, 530B and 580 may be replaced with Ball Bearings. In some embodiments, the Gate Frame Portion 540 may also comprise Horizontal Rollers 580 instead of vertical frames.

Figure 5C:
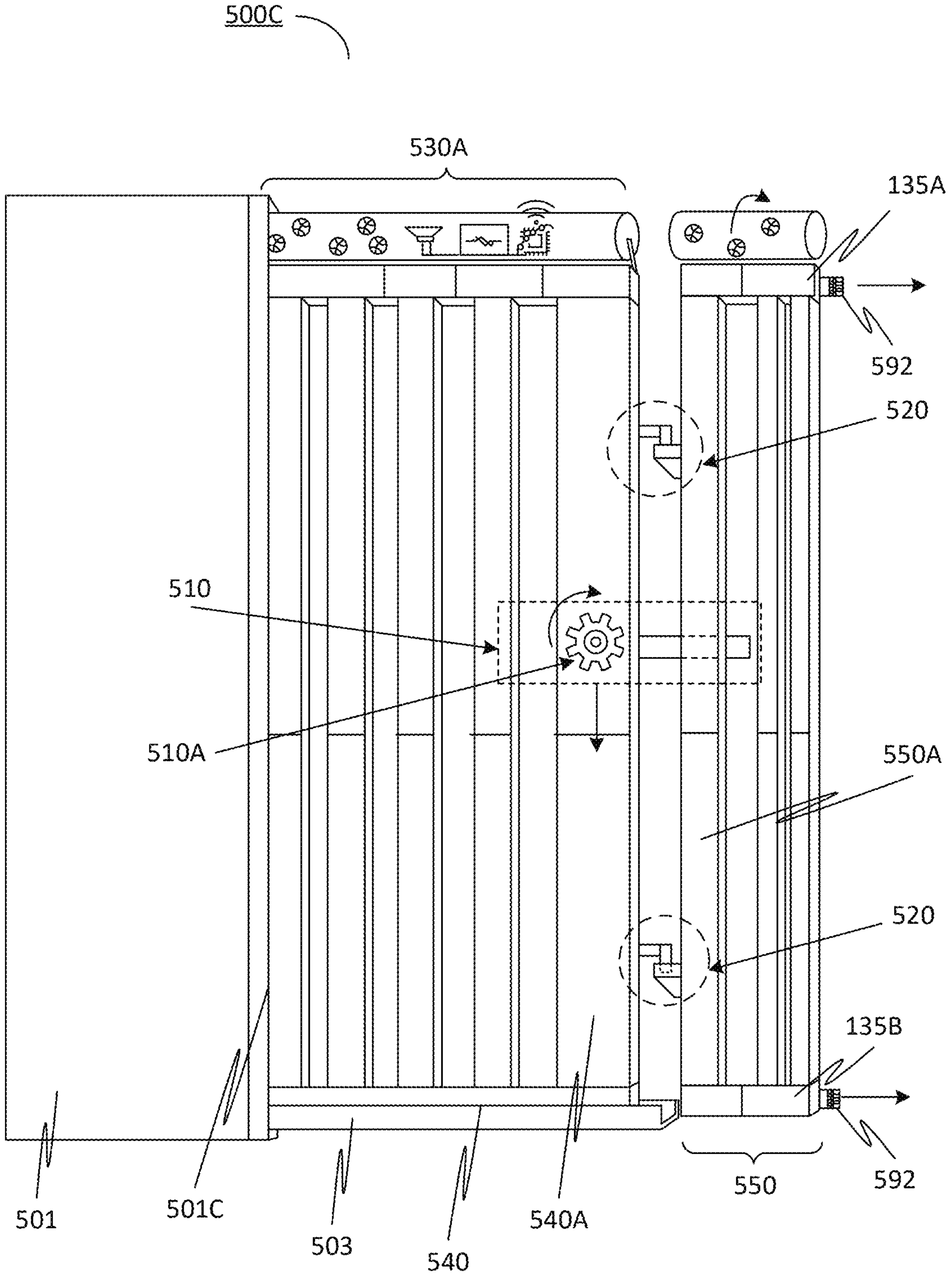
FIG. 5C illustrates an exemplary gate comprising a pocket gate that is stored or secured within the wall and pulled out and locked in place for use.

Referring now to FIG. 5C, an advanced and secure pet and child confinement Gate 500C, the Gate 500C can be designed for installation in new construction as a pocket door as illustrated in some embodiments of the device. Such a design allows the Gate 500C to be seamlessly retracted and hidden away within a Wall Cavity 501C when not in use, preserving the aesthetic and spatial integrity of the environment. When needed for security or confinement, the gate can be easily pulled out from its pocket in the wall and securely locked into place.

This installation method involves incorporating a Track System 503 within the Wall 501, along which the Gate 500C slides smoothly. In some embodiments, when retracted, the Gate 500C may be placed entirely (or at least substantially) out of sight, such as tucked away inside a Wall 501. To deploy the Gate 500C, a user may pull the Gate 500C out from its concealed position, extending the Gate 500C across the doorway (or other expanse) to span the entire opening of the doorway or expanse. This mechanism may include Locking Features 592 that securely anchor the Gate 500C at both ends when extended, ensuring that the Gate 500C provides a sturdy barrier when in use.

The Gate 500C features a First or Primary Locking Mechanism 520 and a Second Locking Mechanism 510, both helpful for maintaining the security of the Gate 500C and preventing unauthorized access as discussed in other embodiments of the present device.

The top of the Gate 500C may comprise Rollers 530A and 530B, which may be mounted on the top rails of both the Left and Right Frame Portions 540 and 550. Roller 530A may be connected to the Left Interior Frame 540A through brackets, screws, nut-bolts, or other fasteners providing a secure attachment. Similarly, Roller 530B may be connected to the Right Interior Frame 550A in the same manner. These Rollers 530A and 530B may be designed to rotate freely, making it difficult for pets or children to climb over the Gate 500C.

In some embodiments, the Rollers 530A and 530B may be hollow and may be equipped with internal sensory components, electronic components, metal balls, loose objects, and communication chips, as discussed in several embodiments of the present device.

Figure 6:
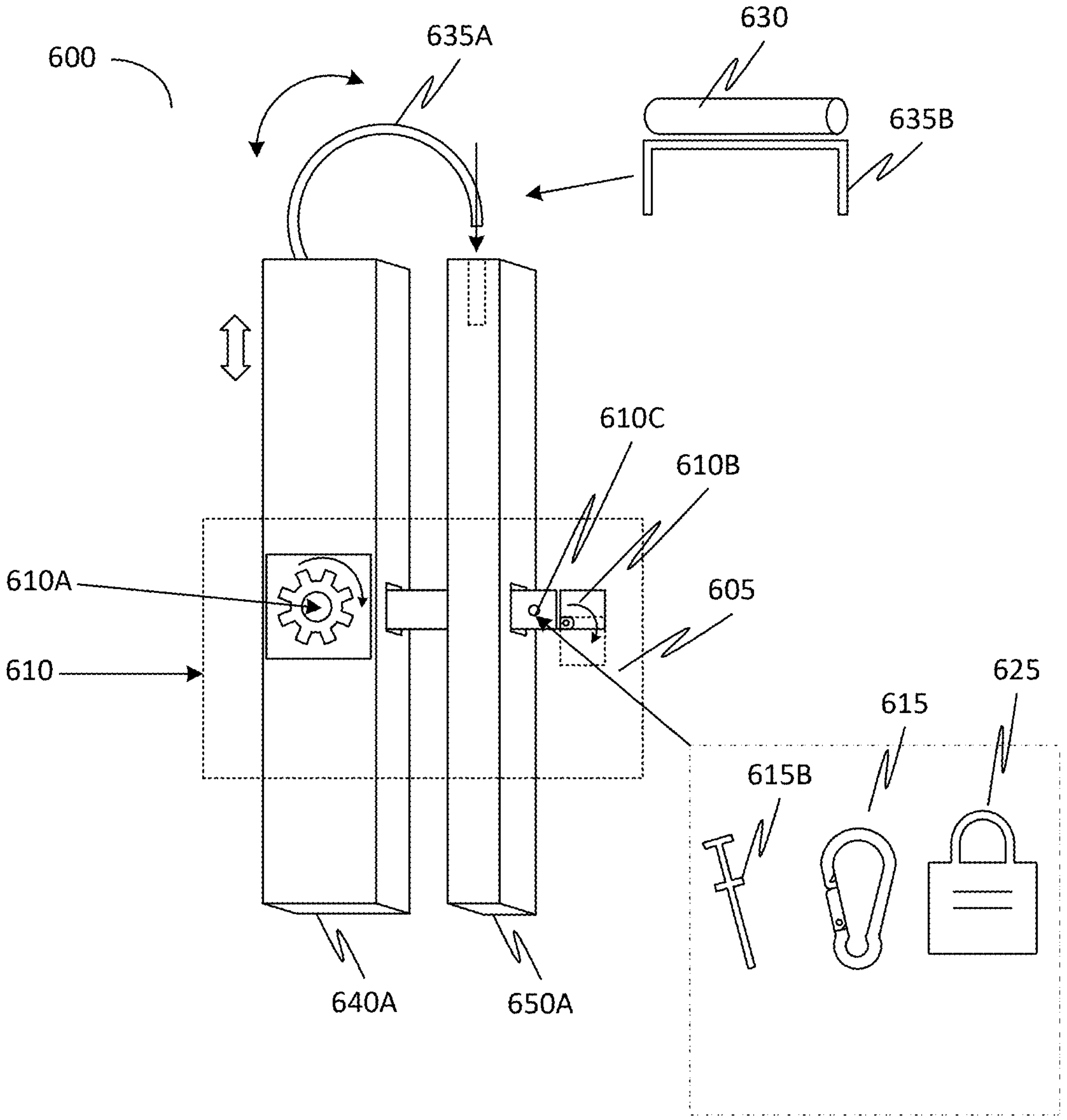
FIG. 6 illustrates additional gate-locking mechanisms as per some embodiments of the present device.

Referring now to FIG. 6, additional exemplary Locking Mechanisms 600 for a pet and child confinement gate as per some embodiments of the present device are illustrated. This figure highlights integration of multiple other Locking Mechanisms designed to further enhance the security and functionality of the gate.

A Second Locking Mechanism 610 comprises a rotatable Knob 610A and a Sliding Bolt 610B located on the Interior Frames 640A and 650A of the gate. To engage the Second Locking Mechanism 610, the Knob 610A is rotated in a first direction, causing the Sliding Bolt 610B to slide into a Receiver Hole 620 on the Right Interior Frame 650A. This action securely locks the gate, preventing any inward, outward or upward movement. The precision design of the Sliding Bolt 610B and Receiver Hole 620 ensures a tight fit, providing security against tampering.

A Third Locking Mechanism 605 may be employed to further secure the Sliding Bolt 610B. The Sliding Bolt 610B may include a Through-Hole 610C, allowing the Third Locking Mechanism 605 to be engaged. The Third Locking Mechanism 605 may comprise a Carabiner Pin 615, other types of Pins 615, such as a cotter pin, or a Lock 625. When inserted through the Through Hole 610C of the Sliding Bolt 610B, these Pins 615-615B prevent the Sliding Bolt 610B from being retracted, thereby adding an additional layer of security.

Additionally, the top of the Gate Frame 640A and the Interior Right Frame 650A features a fourth locking mechanism designed for extra security. This fourth locking mechanism may comprise an Arc Handle 635A, which is fixed to one of the Interior Frames, either 640A or 650A, at the top. The Arc Handle 635A can be moved or rotated into a Receiving Cavity 635C formed in the top of the opposite Interior Frame, either 640A or 650A (as indicated by the arrow direction). This action locks the two Interior Frames 640A and 650A together at the top, preventing any separation or unwanted opening of the gate. The Arc Handle 635A may be designed for ease of operation, providing a quick but secure method to reinforce the gate's locking system.

In alternative embodiments, the fourth locking mechanism may utilize a differently shaped handle, such as Handle 635B. This Handle 635B may be designed with a Roller 630 on its top. When force is applied in a gate-crossing attempt, the Roller 630 rotates, making it difficult for pets or children to gain a foothold or apply sufficient pressure to climb over the gate. The Handle 635B and Roller 630 combination not only enhances security but also incorporates a mechanical deterrent that is both simple and effective.

The detailed design of these locking mechanisms ensures that the gate provides comprehensive security through multiple layers of protection. The integration of the second and third locking mechanisms ensures the gate remains securely locked at the initial access point, while the fourth locking mechanism reinforces the top section of the gate. The use of rotatable components, such as the Roller 630, adds an additional level of deterrence on the Arc Handle 635A against climbing, ensuring the gate remains effective even against determined pets or children.

The materials chosen for these locking mechanisms may be selected for their strength and durability, ensuring long-term reliability and resistance to wear and tear. The various Pins 615-615B used in the Third Locking Mechanism 605, such as the Carabiner Pin 615B and the Cotter Pin 615, may be designed to be easily removable by authorized users or caretakers but secure enough to prevent tampering by children or pets. The pin may be attached to the gate frame by a tether to prevent loss when not in use and to provide easy and quick accessibility when needed.

Figure 7A:
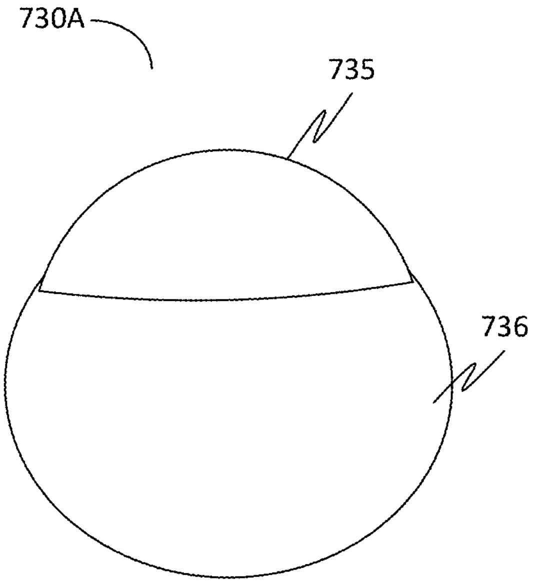
FIGS. 7A-7B illustrate exemplary bearing mechanisms as per some embodiments of the present device.

Referring now to FIG. 7A, a Ball-Bearing Component 730A, an integral part of the pet and child confinement gate designed to enhance its functionality and security, is illustrated. The Ball-Bearing Component 730A comprises a rotatable Ball 735 held securely within a Ball-Holding Cup 736. This modular design ensures that the Ball 735 can rotate freely within its Holding Cup 736, providing a crucial deterrent against climbing.

The Ball-Holding Cup 736 may be constructed from various materials, including metal, plastic, or wood, depending on the specific requirements and preferences for durability, aesthetics, and functionality. Metal Ball-Holding Cups 736 offer high durability and resistance to wear and tear, making them ideal for high-traffic areas. Plastic Ball-Holding Cups 736 provide a lightweight and cost-effective option, while wooden Ball-Holding Cups offer a more traditional and visually appealing choice, blending seamlessly with wooden gates.

In some embodiments, a key feature of this Ball-Bearing Component 730A includes its modular nature. This allows it to be attached to any part of the pet and child confinement gate where additional climbing deterrence is needed. The versatility of this component means it can be incorporated into the gate during the manufacturing process, ensuring it is integral to the gate's design. Alternatively, users have the option to assemble and attach these components at the time of gate installation, tailoring the gate to their specific needs and preferences.

The assembly of the Ball-Bearing Component 730A to the gate is straightforward and secure. It can be fixed in place using screws, nut-bolt assemblies or fixed soldering, ensuring a stable and reliable attachment. The use of screws or nut-bolt assemblies allows for easy installation and removal, providing flexibility for repositioning or replacement as needed. Soldering offers a more permanent and tamper-resistant option, ideal for securing the components in high-stress areas or where additional security is required.

Such a modular and flexible design may ensure that the Ball-Bearing Component 730A can be strategically placed to enhance the overall security of the gate. Whether used on the top rails, side frames, or other vulnerable areas, the freely rotating balls effectively prevent pets and children from gaining a stable foothold, thus deterring climbing attempts. The ability to customize the placement and number of these components makes the gate highly adaptable to different environments and user requirements.

Figure 7B:
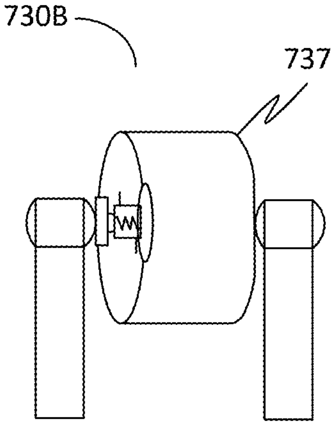

Referring now to FIG. 7B, an Alternative Assembly 730B to the Ball-Bearing Component 730A, offering another effective means to enhance the anti-climbing features of a pet and child confinement gate. This Alternative Assembly 730B comprises a simple Tire-Shaped Rotational Component 737, which can be used in place of or alongside the Ball-Bearing Components 730A to prevent climbing.

The Tire-Shaped Rotational Component 737 is designed to rotate freely around its axis, providing a smooth and continuous surface that is difficult for pets and children to grip or climb. This rotation is facilitated by the design of the Tire-Shaped Rotational Component 737, which may include an internal axle and bearing system, ensuring that the tire spins easily when force is applied. The cylindrical shape of the Tire-Shaped Rotational Component 737 allows it to roll efficiently, creating a dynamic barrier against climbing attempts. The Tire-Shaped Rotational Component 737 may also be constructed from various materials, including durable plastics, metals, or rubber composites.

This assembly may be mounted onto the gate using a solid framework that includes support arms or brackets. These brackets may securely hold the Tire-Shaped Rotational Component 737 in place while allowing it to rotate freely. The support arms can be attached to various parts of the gate, such as the top rails or vertical frames, using screws. nut-bolt assemblies or fixed soldering. This method of attachment ensures that the Alternative Assembly 730B is securely fixed in position while maintaining its rotational capability.

The internal axle of the Tire-Shaped Rotational Component 737 may also include a spring mechanism or other damping features to absorb and dissipate energy when pressure is applied. This design may ensure smooth rotation and prevent jamming or sticking, even under continuous use. The incorporation of a spring mechanism may also add a slight bounce to the Tire-Shaped Rotational Component 737, making it even more challenging for pets or children to maintain a grip. In some embodiments, the Tire-Shaped Rotational Component 737 may include additional sensory or electronic features.

The versatility of the Tire-Shaped Rotational Component 737 makes it an excellent alternative or complement to the Ball-Bearing Components 730A. Its design is particularly effective for preventing climbing on vertical surfaces, such as the sides of the gate, where a continuous, rotating surface can significantly impede any upward movement. The modular nature of this component allows it to be easily integrated into various parts of the gate, enhancing its overall security and functionality.

Figure 7C:
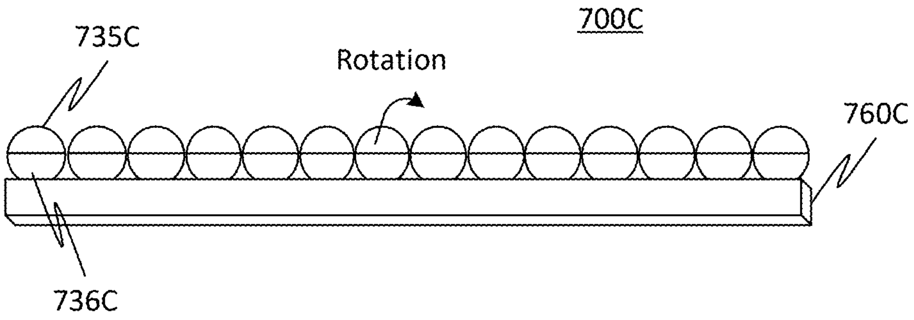
FIGS. 7C-7F illustrate exemplary free-spinning mechanisms as per some embodiments of the present device.

Referring now to FIGS. 7C-7F, some exemplary free-spinning mechanisms designed for the top frames of gate sections such as one or more of the left frame portion, the central gate frame portion, and the right frame portion are illustrated. FIG. 7C features a Ball-Bearing Mechanism 700C comprising Balls 735C, which are strategically housed within Ball-Holding Cups 736C. The entire Ball-Bearing Mechanism 700C is affixed to a Frame 760C, which serves as the structural support for the Ball-Bearing Mechanism 700C.

The Balls 735C are designed to rotate freely within their respective Ball-Holding Cups 736C. This free rotation provides a dynamic barrier that prevents pets or children from gaining a stable grip, thus thwarting attempts to climb over the gate. The smooth, spherical surface of the Balls 735C, combined with their continuous movement, effectively discourages any foothold, enhancing the gate's security.

The Ball-Holding Cups 736C are engineered to perfectly cradle each Ball 735C, ensuring that the Balls 735C remain securely in place while allowing unrestricted rotation. These Ball-Holding Cups 736C are attached to the Frame 760C, which can be either at the very top of the gate sections or integrated into the design in a way that aligns with the structural aesthetics of the gate.

To ensure durability and stability, the Ball-Holding Cups 736C can be fixed to the Frame 760C in several ways. In some designs, screws are used for attachment, providing the flexibility to remove or adjust the Ball-Holding Cups 736C as needed for maintenance or replacement of the Balls 735C. In more permanent applications, the Ball-Holding Cups 736C are welded directly to the Frame 760C, offering enhanced security and resilience against physical stress or tampering.

Figure 7D:
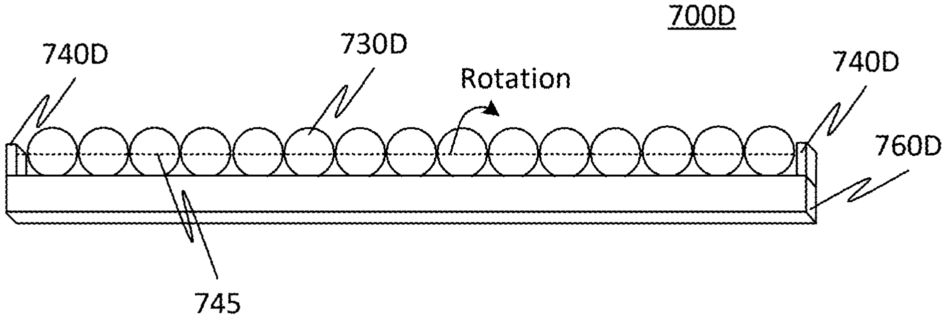

FIG. 7D illustrates a free-spinning Ball-Bearing Mechanism 700D, designed to enhance the safety features of gates according to some embodiments of the current device. In this configuration, multiple Balls 730D are threaded onto a metallic Cable or Rod 745. This Cable or Rod 745 ensures that the Balls 730D are held in precise alignment and can rotate freely, providing an effective barrier against gate-climbing.

The Ball-Bearing Mechanism 700D is securely fixed to the Frame 760D through Posts 740D located at both ends of the Cable or Rod 745. These Posts 740D are not only helpful in maintaining the structural integrity of the setup but also in facilitating the smooth rotation of the Balls 730D. By anchoring the Cable or Rod 745 on both sides, the system ensures that the Balls 730D remain in place and function effectively under the physical stress of use. In some embodiments of the present device, the Balls 730D may be configured in a linear arrangement within a rail or track, which is mounted along the top of the gate and its Frame 760D.

Figure 7E:
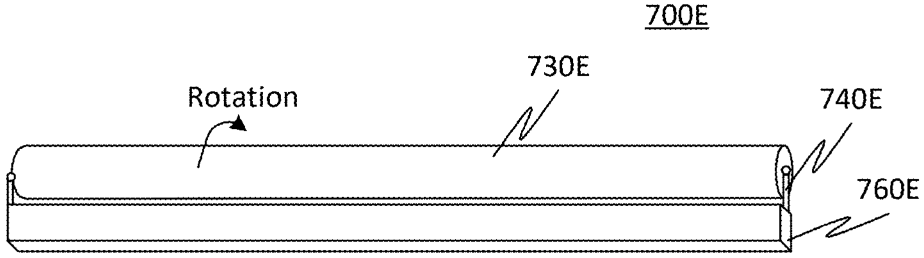

FIG. 7E illustrates a free-spinning Roller-Based Mechanism 700E as per some embodiments of the present device. In this design, the Roller 730E is mounted on top of the Frame 760E, effectively functioning as a deterrent against climbing over the gate by pets or children. The Roller 730E is connected to the Frame 760E by thin Posts 740E at both sides, which facilitate free rotation.

The design and placement of the Roller 730E ensure that it can spin smoothly around its axis, which is anchored by the thin Posts 740E. This rotation mechanism is helpful to prevent stable contact or grip that could be used to climb the gate. The Roller 730E is designed to turn effortlessly with minimal force, ensuring that even the slightest pressure from a hand, foot, or pet's paw will cause the Roller 730E to rotate, thereby denying the climber leverage.

Figure 7F:
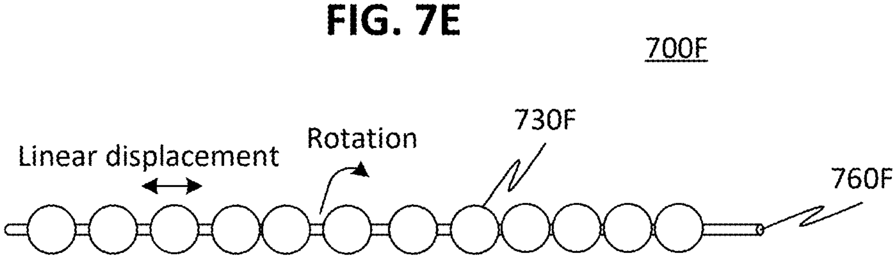

FIG. 7F demonstrates an exemplary Ball-Bearing Mechanism 700F designed to enhance the security of gates by deterring climbing attempts. In this design, Balls 730F are threaded unevenly onto a Cable or Rod 760F. This uneven spacing between the Balls 730F is strategic, allowing each Ball 730F to move both rotationally and linearly along the Cable or Rod 760F.

When pressure is applied to any of the Balls 730F, such as during an attempt by pets or children to climb the gate, the affected Ball 730F rotates around its own axis. Additionally, the force exerted causes this Ball 730F to slide along the Cable or Rod, prompting adjacent Balls 730F to also slide and/or rotate. This movement generates a dynamic, unpredictable motion that complicates efforts to gain a stable grip or footing on the surface of the gate.

In some embodiments of the present device, the balls and/or rollers may be coated with a dry lubricant, such as, for example, an anti-friction graphite coating (not shown) or a silicon coating, for long-lasting reduction of sliding friction to ensure the balls continue to spin freely on physical contact by pets or children. This anti-friction coating may be applied to enhance the durability and effectiveness of the free-spinning mechanism. The graphite layer, known for its low friction properties, facilitates a smoother rotation of the balls and rollers, preventing the accumulation of debris and dirt that might otherwise hinder their movement. Such a coating not only reduces the wear and tear from regular use but also maintains the gate's efficiency in preventing climbing by ensuring that the movement mechanism remains uninterrupted and effective over time.

Figure 8:
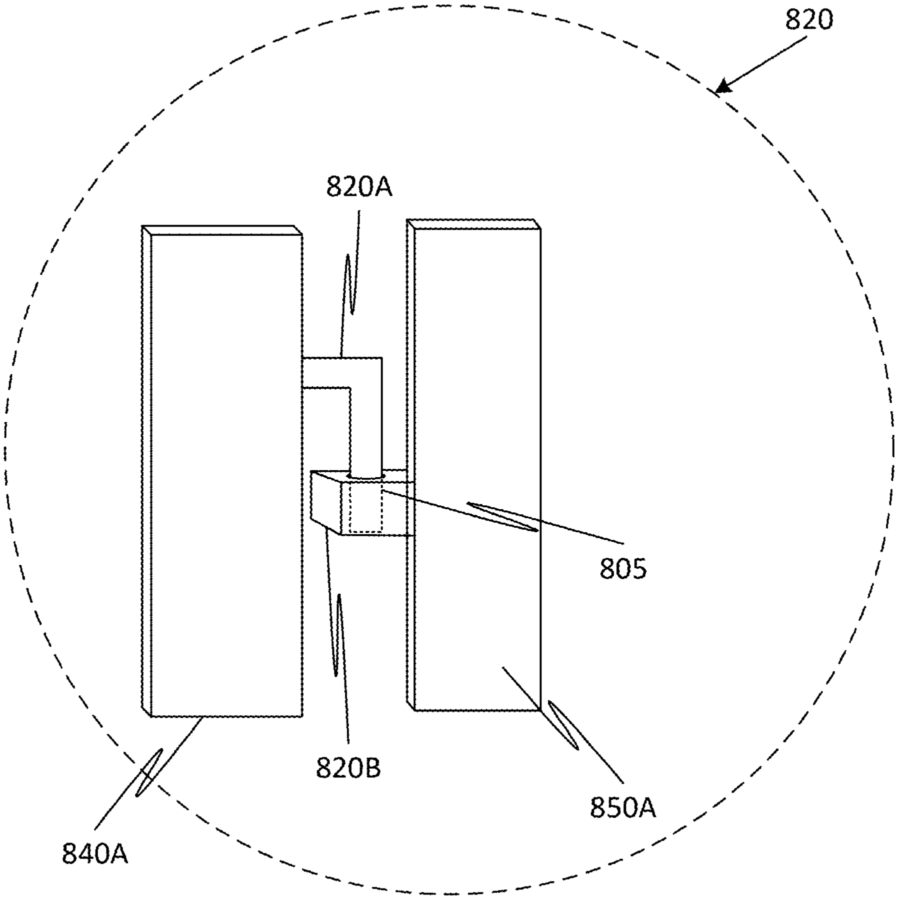
FIG. 8 illustrates a drop-in catch and metal sheath locking mechanism as per some embodiments of the present device.

Referring now to FIG. 8, a Primary Locking Mechanism 820 of the pet and child confinement gate as per various embodiments of the present device is illustrated in detail. This Primary Locking Mechanism 820 comprises a Drop-In Catch 820A attached to a Left Interior Gate Frame 840A and an Extended Metal Sheath 820B attached to a Right Interior Gate Frame 850A. The Extended Metal Sheath 820B features a Hole or Cavity 805 specifically designed to accommodate a portion of the Drop-In Catch 820A, thereby securing the gate.

To engage the Primary Locking Mechanism 820, a knob on the Left Interior Gate Frame 840A is marginally lifted. This action raises the Drop-In Catch 820A, allowing it to be positioned over the Hole or Cavity 805 formed in the Extended Metal Sheath 820B. Once aligned, the knob is gently lowered, causing a portion of the Drop-In Catch 820A to insert into the Hole or Cavity 805, securely locking the gate. This process ensures that the gate cannot be opened or moved without first disengaging this locking mechanism.

In some embodiments, the Hole or Cavity 805 in the Extended Metal Sheath 820B may be designed as a through-hole cavity. This configuration allows the portion of the Drop-In Catch 820A to extend completely through and cross the bottom surface of the Extended Metal Sheath 820B. This through-hole design ensures a more secure engagement by providing an additional locking depth, making it significantly more difficult for pets or children to dislodge the catch from the sheath. The through-hole cavity enhances the overall stability and security of the gate by ensuring that the Drop-In Catch 820A is firmly anchored, thereby preventing any potential disengagement from upward or lateral forces.

To disengage the Primary Locking Mechanism 820, the knob is again lifted, which raises the Drop-In Catch 820A out of the Hole or Cavity 805 formed in the Extended Metal Sheath 820B. This lifting action effectively unlocks the gate, allowing it to be opened. The design of this mechanism ensures that it can be easily operated by an adult while remaining secure against tampering by children or pets.

Both the Drop-In Catch 820A and the Extended Metal Sheath 820B may either be fixedly attached to the Interior Frame Portions 840A-850A of the gate or designed as modular components. If fixedly attached, they can be integrated into the gate during the manufacturing process, ensuring a sturdy and permanent installation. Alternatively, if designed as modular components, they can be attached during the installation process using screws, nut-bolts, or soldering, depending on the user's requirements and preferences. This modularity provides flexibility, allowing users to customize the gate's security features according to their specific needs.

Figure 9:
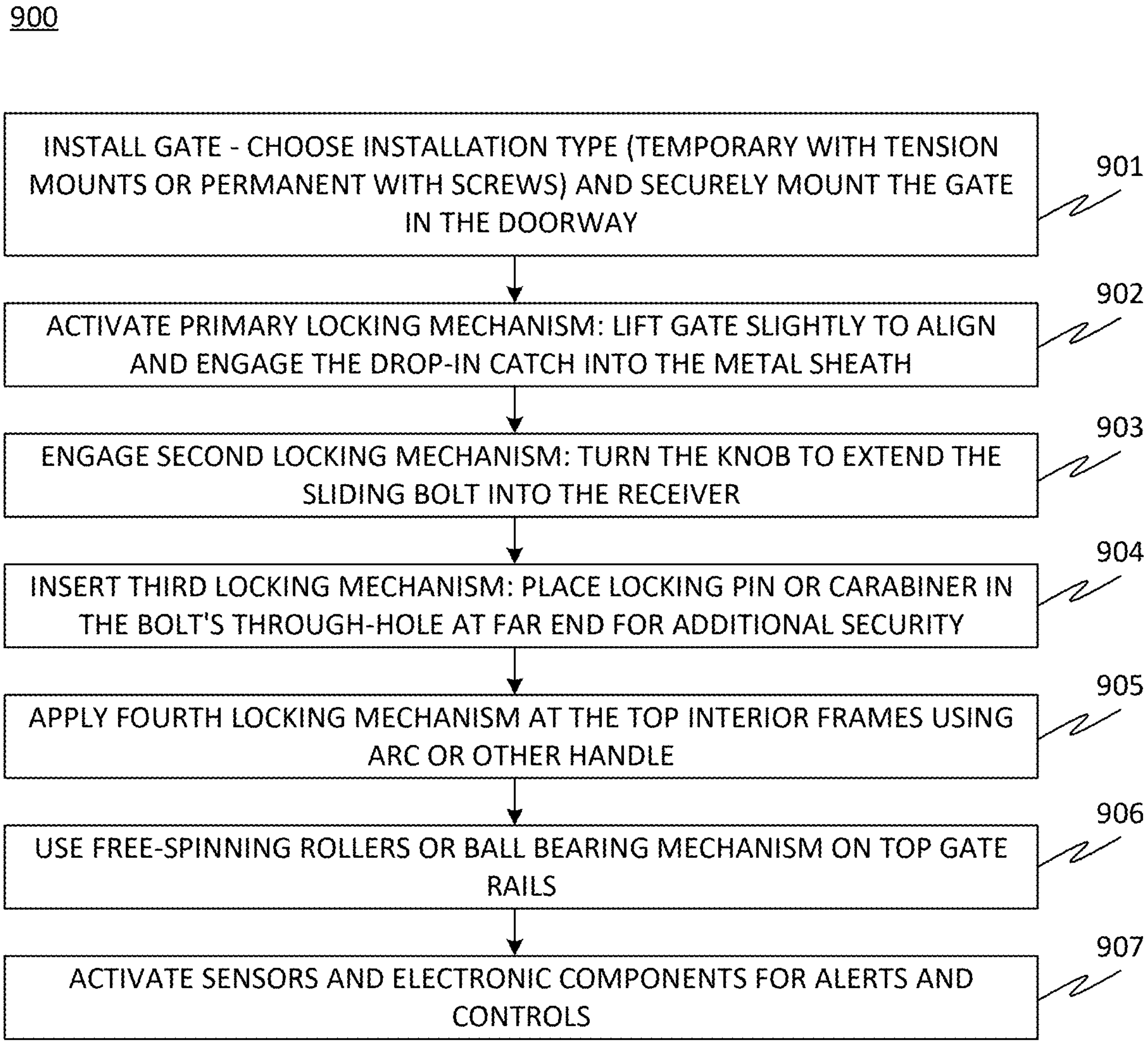
FIG. 9 illustrates exemplary method steps for securely confining pets or children within a gate of the present device.

Referring now to FIG. 9, an Exemplary Method 900 for securing a pet or child within a confinement gate in some embodiments of the present disclosure is illustrated. The method outlines the sequential steps to ensure that the gate is properly installed, and all security features are engaged to prevent unauthorized access and climbing attempts.

At step 901, the method begins with the installation of the gate. A user must choose between a temporary installation using tension mounts or a permanent installation using screws. For a temporary setup, tension mounts are advantageous as they allow the gate to be securely positioned without causing damage to the walls, which is ideal for rental properties or temporary needs. These mounts work by using adjustable pressure to hold the gate in place. On the other hand, a permanent installation uses screws and/or hinges to firmly attach the gate to the doorway, providing a more stable and enduring setup suitable for long-term use. This method involves drilling holes into the wall and securing the gate with screws and anchors to ensure maximum stability. Once the installation type is chosen, the gate is securely mounted in the selected location, ensuring it is both stable and properly aligned. It is crucial to verify that the gate is level, and the hinges are properly attached to allow for the correct movement and functionality of the gate.

At step 902, a primary or first locking mechanism is activated to provide a primary layer of security. This step involves lifting the gate slightly to align a drop-in catch with a hole or cavity in an extended metal sheath on an opposing frame. Once aligned, the gate is gently lowered, allowing a portion of the drop-in catch to insert into the metal sheath, securely engaging the first locking mechanism.

At step 903, a second locking mechanism is engaged to secure the gate. This involves turning a rotatable knob in a first direction to extend a sliding bolt into a receiver hole on the opposite frame. The sliding bolt serves as additional security feature, locking the gate in place and preventing any inward, outward, and upward movement. The precision fit of the sliding bolt and receiver hole ensures a tight connection, providing security against tampering. When the sliding bolt is fully inserted into the receiver the gate is securely locked. This step provides extra security by ensuring that the primary locking mechanism cannot be disengaged. This dual-locking system is particularly useful in preventing intelligent pets or children from tampering with the gate.

At step 904, a third locking mechanism may be inserted for additional security. This involves placing a locking device, a locking pin or a carabiner through a through-hole at a far end in the sliding bolt. The third locking mechanism prevents the sliding bolt from being retracted, adding another level of security. This step is essential for ensuring that the gate remains locked, providing peace of mind that it cannot be easily opened by unauthorized individuals. The use of a carabiner pin is particularly effective as it can be quickly engaged and disengaged by an adult while remaining secure against tampering by children or pets. The pin may be attached to the gate frame by a tether to prevent loss when not in use and to provide easy and quick accessibility when needed.

At step 905, a fourth locking mechanism may be applied at the top interior frames using an arc handle or another type of handle. The arc handle is attached to one of the interior frames at the top and rotated into a cavity formed in the top of the opposite interior frame. Alternatively, a handle with a roller on its top may also be used. When force is applied in a gate-crossing attempt, the roller rotates, preventing pets or children from gaining a stable grip and thereby deterring climbing attempts. This mechanism ensures that the top of the gate is securely locked, preventing separation and providing comprehensive security.

At step 906, free-spinning rollers or ball-bearing mechanisms are incorporated on the top gate rails. These components rotate freely when force is applied, preventing pets or children from climbing over the gate. The free-spinning rollers or ball-bearings serve as effective mechanical deterrents, ensuring that any attempt to climb the gate is thwarted. These components can be strategically placed to cover areas where climbing attempts are most likely to occur, providing an additional layer of security.

In some embodiments, the width of the free-spinning rollers or ball-bearing mechanisms can be designed to be greater than the width of the gate frames. This extended width ensures that the rollers or ball-bearings overhang the edges of the gate, providing a larger surface area that effectively prevents pets or children from gaining a stable grip anywhere along the top of the gate. The increased width amplifies the deterrent effect, making it even more challenging for climbing attempts to succeed.

The free-spinning rollers or ball-bearing mechanisms may provide an effective deterrent against pets or children attempting to climb over the gate through a combination of physical and sensory deterrents. When a pet places its paws or a child places their hands on the free-spinning roller or ball-bearing mechanisms at the top of the gate, the roller or balls spin toward them, making it impossible to use as a stable climbing support. Additionally, a sensor embedded in the frame detects touch and pressure on the roller or balls, triggering a strong but harmless vibration that the pet or child will find uncomfortable or startling, thereby discouraging further climbing attempts. Furthermore, in some embodiments, the free-spinning roller or ball-bearing mechanism may be filled with Loose Objects such as metal bearings or gravel. When the roller or ball-bearing moves, these objects create noisy collisions, serving as an additional deterrent and alerting the user to any climbing attempts. This multi-faceted approach ensures a high level of security by combining mechanical obstruction with sensory feedback to prevent unauthorized access.

At step 907, sensors and electronic components may be activated for alerts and controls. Pressure sensors, motion detectors, and communication chips may be integrated into the gate components. These sensors detect tampering or climbing attempts and trigger alarms or send notifications to a caregiver's mobile device. For example, a pressure sensor embedded in the rollers can detect when a pet or child is attempting to climb, and a connected communication chip can send an instant alert to the caregiver. The integration of electronic components may enhance the gate's functionality, providing real-time monitoring and alerts to ensure the safety and security of pets and children. This advanced technology ensures that caregivers are immediately aware of any unauthorized attempts to cross the gate, allowing them to take prompt action.

To unlock the gate, the following steps and additional mechanisms may be used to ensure security while maintaining ease of use for authorized users and caregivers.

In one embodiment, to unlock the gate, the user must first disengage the fourth locking mechanism located at the top of the gate. If an arc handle is used, the user rotates it out of the cavity in the opposite interior frame. Alternatively, if a handle with a roller is used, the user may lift and rotate the handle out of its locked position. This action releases the top of the gate, making it possible to proceed with the unlocking process.

Next, the third locking mechanism, typically a locking pin or carabiner, must be removed from the through-hole in the sliding bolt. This step ensures that the sliding bolt can be retracted. The user must manually remove the pin or carabiner, which is designed to be easily operable by adults but secure against tampering by children or pets. In some embodiments, a lock may be used instead of pins. The lock must be unlocked using its key.

Following this, the user must turn the knob in an opposite direction to retract the sliding bolt from the receiver on the opposite frame. This action disengages the second locking mechanism, allowing the gate to be lifted but cannot be opened yet, as the primary locking mechanism is still in place.

Finally, the user disengages the primary locking mechanism by lifting the gate slightly to raise the drop-in catch out of the hole or cavity in the extended metal sheath. This upward motion disengages the primary lock, and the user can then swing the gate open, either inward or outward, depending on the hinge configuration and the specific needs of the space.

In some embodiments, additional electronic safeguards may be included. For example, the gate may be equipped with a sensor system that detects when all mechanical locks have been disengaged. This system may send a notification to a designated mobile device, alerting the caregiver that the gate has been unlocked. This feature ensures that the caregiver is always aware of the status of the gate, adding an extra layer of security and peace of mind.

Moreover, the gate may incorporate a child safety lock mechanism, which requires pressing a hidden button or sliding a latch while performing the unlocking steps. This additional step ensures that young children cannot easily unlock the gate, even if they manage to manipulate the primary and secondary locks.

Figure 10:
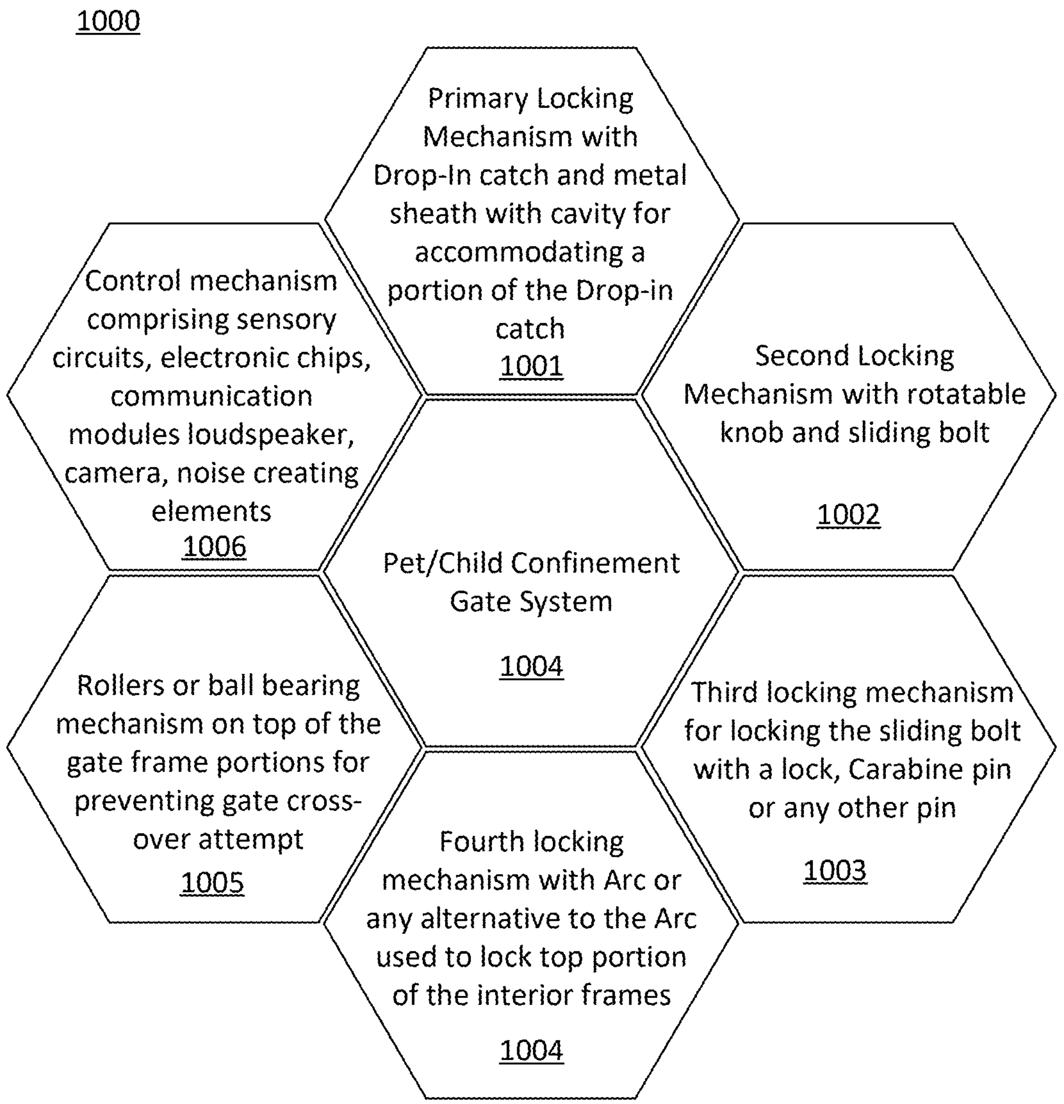
FIG. 10 illustrates an exemplary hexagonal layout showing a pet/child confinement gate system in accordance with some embodiments of the present device.

Referring now to FIG. 10, an exemplary pet and child confinement gate system 1000 in accordance with the present device is illustrated. The Gate System 1000 details various components and mechanisms designed to enhance security and prevent unauthorized access and climbing attempts to the pet and child confinement gate. The figure is structured in a hexagonal layout, where each hexagon represents a specific mechanism or feature of the Gate System 1000, interconnected to form a comprehensive security solution.

Primary Locking Mechanism with Drop-in Catch and Metal Sheath (1001):

The Primary Locking Mechanism 1001 may comprise a drop-in catch and an extended metal sheath with a cavity designed to accommodate a portion of the catch. This mechanism may provide a primary security by requiring the user to lift the gate slightly to unseat the catch from the sheath, for operating the gate. This design ensures that even if the second lock is compromised, the gate remains securely closed.

Second Locking Mechanism with Rotatable Knob and Sliding Bolt (1002):

The Second Locking Mechanism 1002 may involve a rotatable knob connected to a sliding bolt. When the knob is turned in a first direction, the sliding bolt extends into a receiver hole on the opposite frame, securely locking the gate. This secondary locking mechanism ensures that the gate cannot be lifted to disengage the primary locking mechanism. For example, this mechanism may be beneficial in preventing pets from nudging the gate up and open with their noses or paws and prevents children from lifting the gate to disengage the primary locking mechanism. The use of high-strength materials like steel for the bolt and receiver may ensure durability and resistance to tampering.

Third Locking Mechanism with Lock, Carabiner Pin, or Other Pins (1003):

The Third Locking Mechanism 1003 may involve inserting/placing a locking device such as a lock, a locking pin, a carabiner pin, or another type of pin through a through-hole at a far end in the sliding bolt. This locking mechanism may ensure that the bolt cannot be retracted, adding another level of security. This is particularly useful in preventing young children from opening the gate, as the pin requires dexterity and strength to remove. The third locking mechanism can be especially effective in households with both small children and pets, ensuring the gate remains closed unless intentionally unlocked by an adult.

Fourth Locking Mechanism with Arc or Alternative Handle (1004):

The Fourth Locking Mechanism 1004 may comprise an arc handle or an alternative locking handle at the top portion of the gate's interior frames. This mechanism locks the top portion of the gate by rotating the handle into a cavity on the opposite frame, preventing the frames from separating. In some embodiments, a handle with a rotating roller or ball-bearing may further deter climbing attempts by making it difficult for pets or children to gain a stable grip. This mechanism is essential for securing the gate in locations where the top portion might be more accessible to climbing attempts.

Rollers or Ball-Bearing Mechanisms on Top Gate Rails (1005):

The Rollers or Ball-Bearing Mechanisms 1005 may be installed on the top gate rails to prevent climbing attempts. These components rotate freely when force is applied, making it difficult for pets or children to use them as grip, support or footholds. In some embodiments, the rollers and/or bearing balls may contain loose objects like metal bearings or gravel, which create noise when moved, further deterring climbing attempts and alerting caregivers to potential breaches. This feature is particularly useful in homes with active pets or children who might attempt to climb over the gate. In some embodiments, the vertical frame in gates can be replaced with horizontal rollers.

Control Mechanism with Sensory Circuits and Electronic Components (1006):

The Control Mechanism 1006 may comprise advanced sensory circuits, electronic chips, communication modules, audio devices, cameras, motors, and noise-creating elements. These components may enhance the gate's functionality by detecting tampering or climbing attempts and triggering appropriate responses, such as vibrations or audible alarms. For instance, sensors embedded in the gate, rollers, or bearing balls can detect when a child or pet is trying to climb and activate a warning sound, trainer voice, startling vibrations, or motor for rotating roller or bearings. The communication modules may also send real-time alerts to a caregiver's mobile device, ensuring immediate awareness of any security breaches.

Each of these mechanisms may work in tandem to create a highly secure and versatile pet and child confinement gate system. The integration of mechanical locks with sensory and electronic deterrents ensures comprehensive protection, catering to various household needs and scenarios.

Figure 11A:
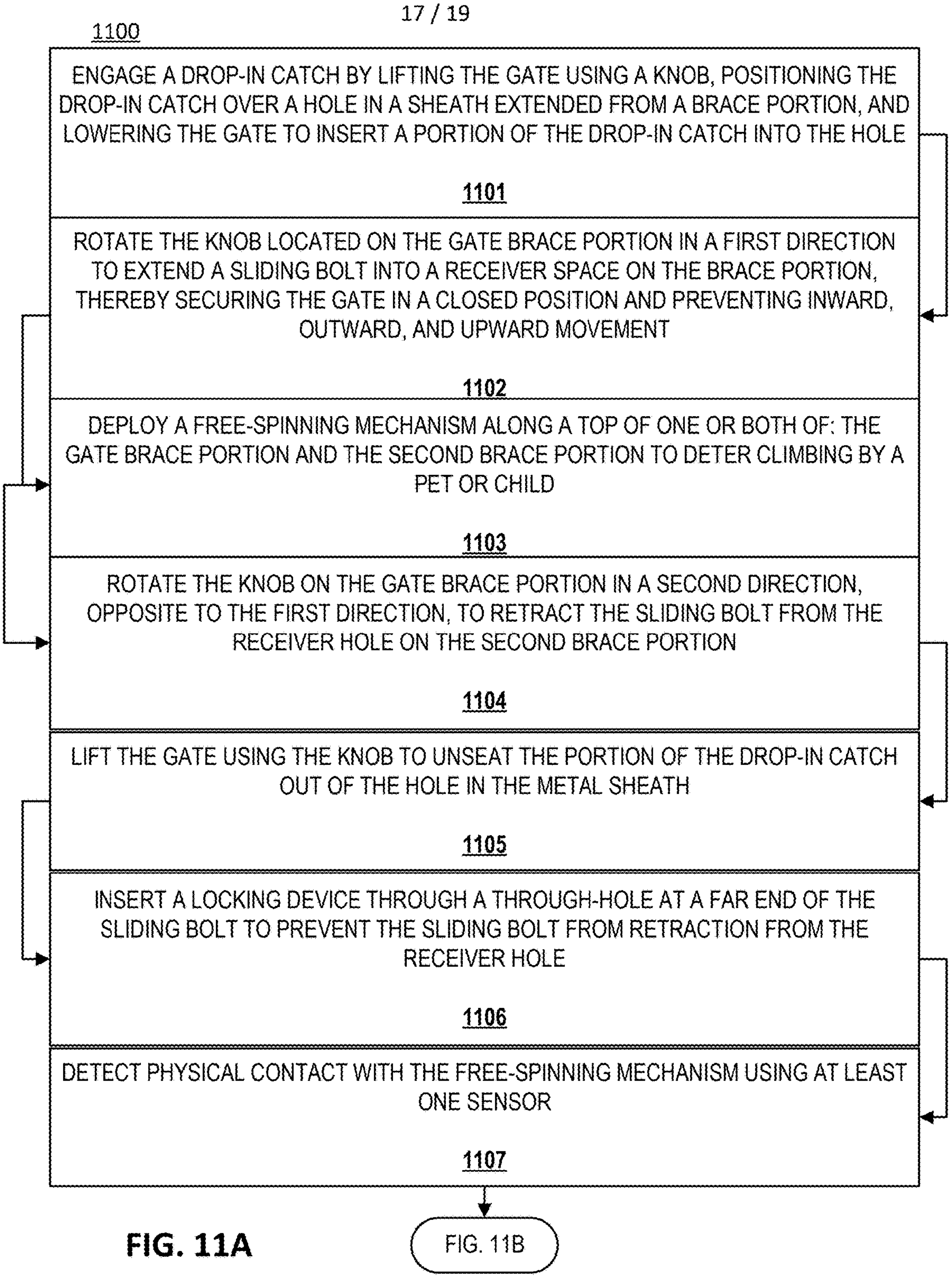
FIGS. 11A-11C illustrate exemplary method steps that may be completed in some embodiments of the present device.
Figure 11B:
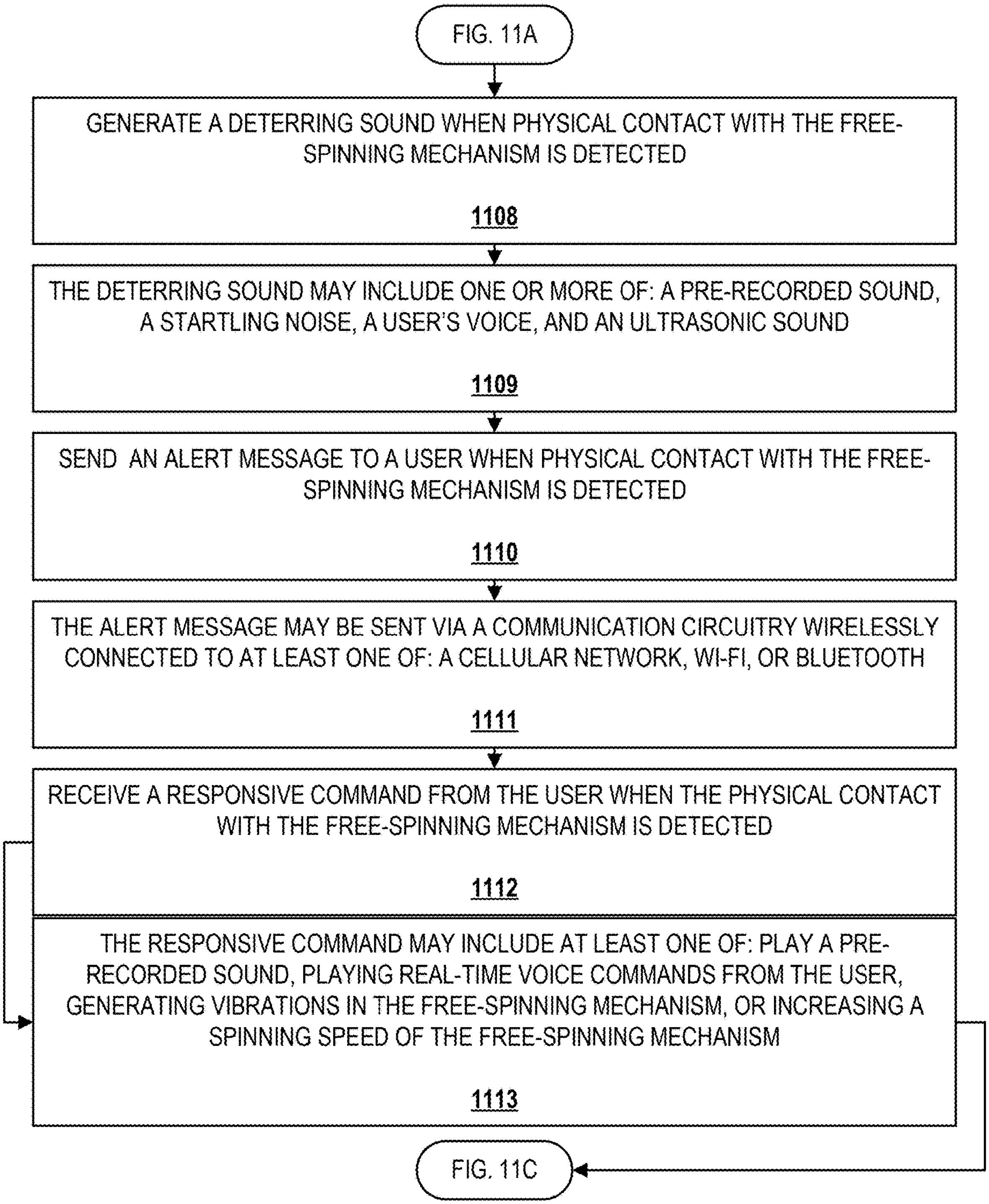
Figure 11C:
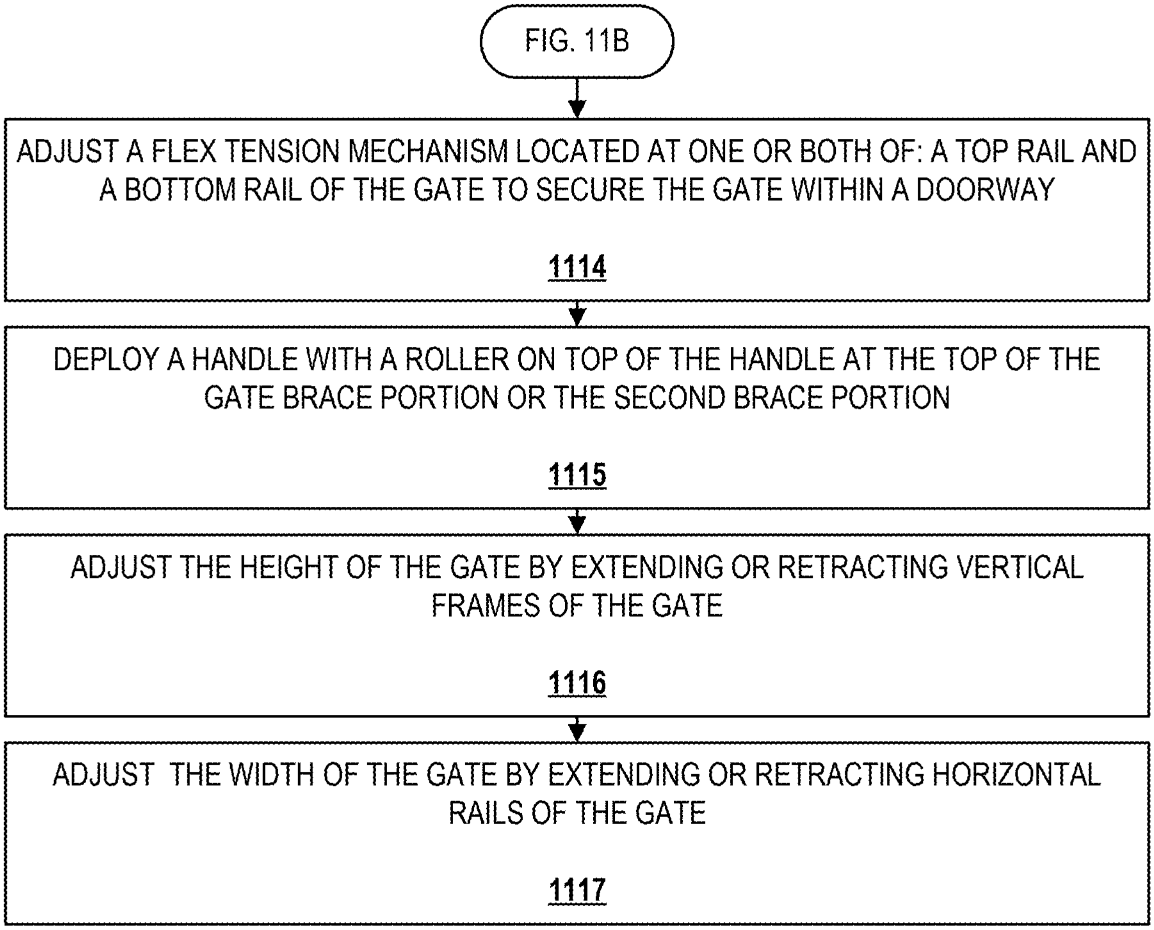

Referring now to FIG. 11, a flowchart of an Exemplary Process 1100 is illustrated. In some implementations, one or more process blocks of FIG. 11 may be performed.

At step 1101, Process 1100 may include engaging a drop-in catch by lifting the gate using a knob, positioning the drop-in catch over a hole in a sheath extended from a brace portion, and lowering the gate to insert a portion of the drop-in catch into the hole (block 1101). For example, device may engage a drop-in catch by lifting the gate using a knob, positioning the drop-in catch over a hole in a sheath extended from a brace portion, and lowering the gate to insert a portion of the drop-in catch into the hole, as described above.

At step 1102, Process 1100 may include rotating the knob located on the gate brace portion in a first direction to extend a sliding bolt into a receiver hole on the brace portion, thereby securing the gate in a closed position and preventing inward, outward, and upward movement (block 1102). For example, device may rotate the knob located on the gate brace portion in a first direction to extend a sliding bolt into a receiver space on the brace portion, thereby securing the gate in a closed position and preventing inward, outward, and upward movement, as described above.

At step 1103, Process 1100 may include deploying a free-spinning mechanism along a top of one or both of: the gate brace portion and the second brace portion to deter climbing by a pet or child (block 1103). For example, the device may deploy a free-spinning mechanism along a top of one or both of: the gate brace portion and the second brace portion to deter climbing by a pet or child, as described above.

At step 1104, Process 1100 may include rotating the knob on the gate brace portion in a second direction, opposite to the first direction, to retract the sliding bolt from the receiver hole on the second brace portion.

At step 1106, a second implementation, alone or in combination with the first implementation, Process 1100 may include lifting the gate using the knob to unseat the portion of the drop-in catch out of the hole in the metal sheath.

At step 1106, a third implementation, alone or in combination with the first and second implementation, Process 1100 may include inserting a locking device through a through-hole at a far end of the sliding bolt to prevent the sliding bolt from retraction from the receiver hole.

At step 1107, a fourth implementation, alone or in combination with one or more of the first through third implementations, Process 1100 may include detecting physical contact with the free-spinning mechanism using at least one sensor.

At step 1108, a fifth implementation, alone or in combination with one or more of the first through fourth implementations, Process 1100 may include generating a deterring sound when physical contact with the free-spinning mechanism is detected.

At step 1109, a sixth implementation, alone or in combination with one or more of the first through fifth implementations, the deterring sound may include one or more of: a pre-recorded sound, a startling noise, a user's voice, and an ultrasonic sound.

At step 1110, a seventh implementation, alone or in combination with one or more of the first through sixth implementations, Process 1100 may include sending an alert message to a user when physical contact with the free-spinning mechanism is detected.

At step 1111, in an eighth implementation, alone or in combination with one or more of the first through seventh implementations, the alert message is sent via a communication circuitry wirelessly connected to at least one of: a cellular network, Wi-Fi, or Bluetooth.

At step 1112, a ninth implementation, alone or in combination with one or more of the first through eighth implementations, Process 1100 may include receiving a responsive command from the user when the physical contact with the free-spinning mechanism is detected.

At step 1113, a tenth implementation, alone or in combination with one or more of the first through ninth implementations, the responsive command may include at least one of: playing a pre-recorded sound, playing real-time voice commands from the user, generating vibrations in the free-spinning mechanism, or increasing a spinning speed of the free-spinning mechanism.

At step 1114, an eleventh implementation, alone or in combination with one or more of the first through tenth implementations, Process 1100 may include adjusting a flex tension mechanism located at one or both a top rail and a bottom rail of the gate to secure the gate within a doorway.

At step 1115, a twelfth implementation, alone or in combination with one or more of the first through eleventh implementations, Process 1100 may include deploying a handle with a roller on top of the handle at the top of the gate brace portion or the second brace portion.

At step 1116, a thirteenth implementation, alone or in combination with one or more of the first through twelfth implementations, Process 1100 may include adjusting the height of the gate by extending or retracting vertical frames of the gate.

At step 1117, a fourteenth implementation, alone or in combination with one or more of the first through thirteenth implementations, Process 1100 may include adjusting the width of the gate by extending or retracting horizontal rails of the gate.

Although FIG. 11 shows example blocks of Process 1100, in some implementations, Process 1100 may include additional blocks, fewer blocks, different blocks, or differently arranged blocks than those depicted in FIG. 11. Additionally, or alternatively, two or more of the blocks of Process 1100 may be performed in parallel.

While the apparatus has been described in conjunction with specific embodiments, it is evident that many alternatives, modifications, and variations will be apparent to those skilled in the art in light of the foregoing description. Accordingly, this description is intended to embrace all such alternatives, modifications, and variations as fall within its spirit and scope.

Several embodiments have been delineated within this document, providing detailed instances of the current device. These particulars should not be interpreted as restrictions on the range of the disclosure or the claims that follow. Instead, they are illustrations of particular embodiments of this disclosure. Expert practitioners will appreciate that the scope of this disclosure extends beyond the specific embodiments and representations herein. The accompanying drawings and their detailed narratives are not meant to confine the device to the illustrated form. On the contrary, the intention is to encompass all changes, equivalents, and remedies that are encompassed within the spirit and scope of the claims of this disclosure.

This specification outlines features presented within distinct embodiments, but it's important to recognize that these can be combined in a single embodiment as well. Similarly, characteristics associated with a single embodiment can be applied across multiple embodiments, whether independently or in any feasible sub-combination. Furthermore, while certain features may initially be described or claimed in concert, it is possible to remove one or more features from this collective, with claims potentially being adjusted to focus on a particular subset or a different iteration of these combinations.

The sequence of method steps shown in the drawings should not be construed as mandatory. The depicted order is illustrative and does not necessarily dictate the sequence in which the steps must be executed, nor is it requisite that all the illustrated steps be completed. The operations can be performed in various orders or configurations to yield the intended outcomes. Nevertheless, it will be understood that various modifications may be made without departing from the spirit and scope of the claimed disclosure.

What is claimed is:

1. A high-security pet and child confinement gate, the gate comprising:

a gate brace portion and a second brace portion;

a drop-in catch positioned on the gate brace portion, a portion of the drop-in catch fits into a hole formed in a metal sheath on the second brace portion, wherein the drop-in catch can be engaged by lifting the gate using a rotatable knob, positioning the drop-in catch over the hole formed in the metal sheath, and lowering the gate to lock the portion of the drop-in catch into the hole formed in the metal sheath;

the rotatable knob positioned on the gate brace portion, the rotatable knob when rotated in a first direction, extends a sliding bolt into a receiver hole located on the second brace portion, securing the gate in a closed position and preventing inward, outward and upward movement of the gate, wherein the sliding bolt additionally comprises a through-hole at a far end for inserting a locking device to prevent the sliding bolt from retraction from the receiver hole; and a free-spinning mechanism positioned along a top of one or both of the gate brace portion and the second brace portion.

2. The gate of claim 1, wherein the rotatable knob, when rotated in a second direction, retracts the sliding bolt from the receiver hole located on the second brace portion, the second direction is opposite to the first direction.

3. The gate of claim 1, wherein the drop-in catch can be disengaged by lifting the gate using the rotatable knob.

4. The gate of claim 1, wherein the sliding bolt comprises a hinge that may be dropped down into a latching mechanism.

5. The gate of claim 1, wherein the free-spinning mechanism comprises one of: a cylindrical roller or a ball-bearing mechanism.

6. The gate of claim 5, wherein the free-spinning mechanism further comprises an inclusion of loose objects inside, so that when the free-spinning mechanism rotates due to physical contact by a pet or child, the loose objects create noise, serving as an auditory deterrent to scare and discourage the pet or child from continuing climbing efforts.

7. The gate of claim 5, wherein the free-spinning mechanism additionally comprises at least one sensor to detect gate-climbing attempts based on detecting physical contact with the free-spinning mechanism.

8. The gate of claim 5, wherein the free-spinning mechanism additionally comprises an audio device to produce a deterring sound when physical contact with the free-spinning mechanism is detected.

9. The gate of claim 8, wherein the deterring sound comprises one or more of: a pre-recorded sound, a noise, a user's voice, and an ultrasonic sound.

10. The gate of claim 1, wherein the locking device comprises one of: a lock, a carabiner pin, and a pin.

11. The gate of claim 1, further comprising a flex tension mechanism located at one or both of a top rail and a bottom rail of the gate, wherein the flex tension mechanism is adjustable to secure the gate within a doorway.

12. The gate of claim 11, wherein a handle further comprises a roller on top of the handle.

13. The gate of claim 1, wherein one or both of the gate brace portion and the second brace portion comprises a plurality of vertical frames.

14. The gate of claim 13, wherein one or both of the gate brace portion and the second brace portion comprises a plurality of horizontal rollers instead of the plurality of vertical frames.

15. The gate of claim 1, additionally comprising a plurality of first locking mechanisms, wherein each of the plurality of first locking mechanisms comprises a drop-in catch positioned on the gate brace portion, the portion of the drop-in catch fits into the hole formed in the metal sheath on the second brace portion, wherein the drop-in catch can be engaged by lifting the gate using the rotatable knob, positioning the drop-in catch over the hole formed in the metal sheath, and lowering the gate to lock the portion of the drop-in catch into the hole formed in the metal sheath.

16. The gate of claim 1, wherein the free-spinning mechanism additionally comprises LED lights that activate when a physical contact with the free-spinning mechanism is detected.

17. A high-security pet and child confinement gate, the gate comprising:

a gate brace portion and a second brace portion;

a drop-in catch positioned on the gate brace portion, a portion of the drop-in catch fits into a hole formed in a metal sheath on the second brace portion, wherein the drop-in catch can be engaged by lifting the gate using a rotatable knob, positioning the drop-in catch over the hole formed in the metal sheath, and lowering the gate to lock the portion of the drop-in catch into the hole formed in the metal sheath;

the rotatable knob positioned on the gate brace portion,-the rotatable knob, when rotated in a first direction, extends a sliding bolt into a receiver hole located on the second brace portion, securing the gate in a closed position, and preventing inward, outward, and upward movement of the gate; and a free-spinning mechanism positioned along a top of one or both of the gate brace portion and the second brace portion, wherein the free-spinning mechanism additionally comprises one of: a cylindrical roller or a ball-bearing mechanism and a communication circuitry to send an alert message to a user when physical contact with the free-spinning mechanism is detected.

18. The gate of claim 17, wherein the communication circuitry comprises a wireless communication device capable of communicating with one or more of a cellular network, Wi-Fi, or Bluetooth.

19. The gate of claim 18, wherein the communication circuitry is adapted to receive a command from a smart device.

20. The gate of claim 19, wherein the command from the smart device is responsive to the physical contact with the free-spinning mechanism and comprises one or more of: playing a pre-recorded sound, playing real-time voice commands from the user, generation of vibrations in the free-spinning mechanism, or increasing a spinning speed of the free-spinning mechanism.

* * * * *